(12) United States Patent
Lamprecht et al.

(10) Patent No.: US 11,632,958 B2
(45) Date of Patent: Apr. 25, 2023

(54) USE OF FUNGICIDES FOR CONTROLLING MOSAIC SCAB IN APPLES

(71) Applicant: BAYER AKTIENGESELLSCHAFT, Leverkusen (DE)

(72) Inventors: Sybille Lamprecht, Leverkusen (DE); Luk De Maeyer, Linter-Diegem (BE); Gilbert Labourdette, Paray le Monial (FR)

(73) Assignee: Bayer Aktiengesellschaft, Leverkusen (DE)

(*) Notice: Subject to any disclaimer, the term of this patent is extended or adjusted under 35 U.S.C. 154(b) by 114 days.

(21) Appl. No.: 16/955,571

(22) PCT Filed: Dec. 17, 2018

(86) PCT No.: PCT/EP2018/085224
§ 371 (c)(1),
(2) Date: Jun. 18, 2020

(87) PCT Pub. No.: WO2019/121525
PCT Pub. Date: Jun. 27, 2019

(65) Prior Publication Data
US 2020/0329712 A1 Oct. 22, 2020

(30) Foreign Application Priority Data
Dec. 20, 2017 (EP) ..................... 17209195

(51) Int. Cl.
*A01N 57/12* (2006.01)
*A01N 43/40* (2006.01)

(52) U.S. Cl.
CPC ............. *A01N 57/12* (2013.01); *A01N 43/40* (2013.01)

(58) Field of Classification Search
CPC ................................ A01N 57/12; A01N 43/40
See application file for complete search history.

(56) References Cited

U.S. PATENT DOCUMENTS

| | | |
|---|---|---|
| 7,572,818 B2 | 8/2009 | Mansfield et al. |
| 7,776,892 B2 | 8/2010 | Grosjean-Cournoyer et al. |
| 2005/0019420 A1 | 1/2005 | Duvert |
| 2006/0043151 A1 | 3/2006 | Stol et al. |
| 2011/0240374 A1 | 10/2011 | Davis et al. |
| 2014/0166731 A1 | 6/2014 | Seo et al. |
| 2015/0041521 A1 | 2/2015 | Matsushita et al. |

FOREIGN PATENT DOCUMENTS

| | | |
|---|---|---|
| CN | 103535374 A | 1/2014 |
| CN | 104646820 A | 5/2015 |
| DE | 2456627 A1 | 6/1975 |
| EP | 1713334 B1 | 7/2008 |
| FR | 3019766 A1 | 10/2015 |
| WO | 93/10935 A1 | 6/1993 |
| WO | 95/26254 A1 | 10/1995 |
| WO | 2004/016088 A2 | 2/2004 |
| WO | 2005/077181 A1 | 8/2005 |
| WO | 2006/113011 A2 | 10/2006 |
| WO | 2017/004333 A1 | 1/2017 |

OTHER PUBLICATIONS

Sundin, George, "SDHI fungicides for apple scab management: MSU Extension", May 8, 2014, Retrieved from the Internet: URL: http://msue.anr.msu.edu/news/sdhi_fungicides_for_apple_scab_management.
Bowen, Joanna K. et al., "Venturia inaequalis: the causal agent of apple scab", Molecular Plant Pathology, 2011, pp. 105-122, vol. 12, No. 2.
Penn State, College of Agricultural Science, Center for Turfgrass Science, http://plantscience.psu.edu/research/centers/turf/extension/factsheets/phosphonate-products.
International Search Report of International Patent Application No. PCT/EP2018/085224 dated Jan. 18, 2019.
Petre, et al., "Fosetyl-AL (Aliette), A Plant Defense Enhancer with Good Efficacy on Bacteria and on Ascomycetes n Apples and Pears," MHS Acta Horticulturae 1094: XII International Pear Symposium, Sep. 30, 2015, Retrieved Tom the Internet: URL: http://www.actahort.org/books/1094/1094_56.htm. Abstract Only.
Anonymous, "Apple scab", Dec. 31, 2000, Retrieved from the Internet: URL: http://www.apsnet.org/edcenter/intropp/lessons/fungi/ascomycetes/pages/applescab.aspx.
Sundin, George, "SDHI fungicides for apple scab management," Michigan State University Extension, Department of Plant, Soil, and Microbial Sciences, (2014).
International Search Report for Application No. PCT/FR2018/053438 dated Apr. 17, 2019.
French Search Report for Application No. 1763028 dated Sep. 14, 2018.

*Primary Examiner* — Shawquia Jackson
(74) *Attorney, Agent, or Firm* — McBee Moore & Vanik IP, LLC

(57) ABSTRACT

Described is the use of compositions comprising a fungicide selected from the group of succinate dehydrogenase inhibitors, in particular fluopyram and a fungicide selected from the group of phosphonates, in particular fosetyl-aluminium for controlling Mosaic scab and reducing Venturia inequalis inoculum in apples, to a method for treating apple plants or apple plant parts for controlling Mosaic scab scab and reducing Venturia inequalis inoculum in apples and to a method for controlling Mosaic scab scab and reducing Venturia inequalis inoculum in plants and plant parts, in particular leaves by treating them with compositions comprising a fungicide selected from the group of succinate dehydrogenase inhibitors, in particular fluopyram and a fungicide selected from the group of phosphonates, in particular fosetyl-aluminium.

20 Claims, No Drawings

USE OF FUNGICIDES FOR CONTROLLING MOSAIC SCAB IN APPLES

CROSS-REFERENCE TO RELATED APPLICATIONS

This application is a National Stage entry of International Application No. PCT/EP2018/085224, filed 17 Dec. 2018, which claims priority to European Patent Application No. 17209195.1, filed 20 Dec. 2017.

BACKGROUND

Field

The invention relates to the use of compositions comprising a fungicide selected from the group of succinate dehydrogenase inhibitors, in particular Fluopyram and a fungicide selected from the group of phosphonates, in particular Fosetyl-aluminium for controlling Mosaic scab in apples, to a method for treating apple plants or apple plant parts for controlling Mosaic scab and to a method for controlling Mosaic scab in plants and plant parts, in particular leaves by treating them with compositions comprising a fungicide selected from the group of succinate dehydrogenase inhibitors, in particular Fluopyram and a fungicide selected from the group of phosphonates, in particular Fosetyl-aluminium.

Description of Related Art

Venturia inaequalis, a hemi-biotrophic fungus is the causal agent of apple scab disease in apple plants and plant parts in a wide geographic range of all apple growing areas (Bowen J K, et al. 2011. Venturia inaequalis: the causal agent of apple scab. Molecular Plant Pathology 12: 105-122). Venturia inaequalis has gained significant attention as already a very low incidence of the disease might render fruits unmarketable therefore having an important economic impact.

Mosaic apple scab is a specific form of scab caused by Venturia inaequalis. Symptoms of mosaic scab develop in a form of small diffuse light or dark gray sporulating lesions on abaxial leaf surface. In literature diffuse scab patterns occurring both at adaxial and abaxial surface are cited as "sheet scab". Mosaic scab refers however only to the abaxial side and expresses a different kind of lesions than the classical ascospore or conidial scab symptoms. Typical mosaic scab symptoms start to appear on the lateral part of the leaf blade, often limited only to one half of the blade. Their development is a consequence of primary infections by ascospores and/or subsequent secondary conidial infections, which develop into a classical diffuse sheet scab on the abaxial leaf surface. Mosaic scab is not detected on fruits in contrast to classical apple scab. Mosaic symptoms appear two to three months after the appearance of first classical scab sporulating lesions of primary infections and one to two months after the first secondary infections on aging leaves, meaning on rosette and spur leaves (leaves of the flower clusters) and extension shoot leaves close the base of the shoots. During this period the fungus is rather inhibited than killed until the breakdown of ontogenic resistance (Gessler and Stumm 1984; Valsangiacomo and Gessler 1988), and reoccurred increased disease susceptibility of the mature leaves that is followed by appearance of mosaic scab symptoms on these mature leaves in the end of the summer (Olivier 1984). The mosaic scab symptoms progress during the season along the extension shoot towards the aging leaves closer to the extension shoot tip, which develop later than the basal ones. Mosaic scab may pose a significant risk to apple growers as the late infection and fungal growth on the shoot leaves at the end of season may lead to significant increased amounts of inoculum for apple scab within the fallen apple leaves. The overwintering spores may contribute to an increased distribution of ascospores in the next spring therefore leading to a higher infection and disease pressure for apple scab in the next season. This may increase the need for more chemical crop protection products.

According to various studies, several factors influence development of apple scab symptoms on older leaves. Among high density of leaf hairs on the abaxial surface of apple leaves, changes in other ontogenic resistance factors are important for development of mosaic scab. These comprise chemical compounds such as salicylic acid (Hugot et al. 1999; Kus et al. 2002), pathogenesis-related proteins (Hugot et al. 1999; Wyatt et al. 1991), phenolic compounds (Mikulic Petkovšek et al. 2008), physiological barriers like the cuticle (Ficke et al. 2002, 2003; Peries 1962), restricted phloem movement (Gacia-Ruiz and Murphy 2001) or a limiting nutritional substrate for fungal infection (Jeun and Hwang 1991). Changes in these factors can influence the V. inaequalis infection process during hyphae growth and stroma establishment and can contribute to development of mosaic scab symptoms on the abaxial leaf epidermis (Li and Xu 2002).

Succinate dehydrogenase inhibitors (SDHI) are active ingredients which inhibit fungal succinate dehydrogenase, a crucial enzyme of the respiration chain. There are different classes of SDHI, several commercial products sold as fungicides contain SDHIs.

Fluopyram refers to a compound of the formula (I)

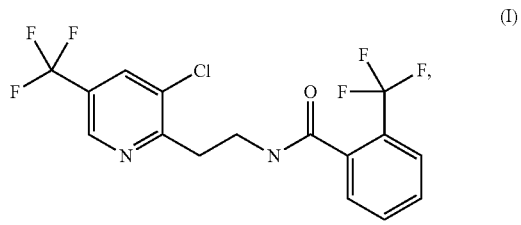 [SMILES: O=C(NCCc1ncc(C(F)(F)F)cc1Cl)c1ccccc1C(F)(F)F]

also known as N-{2-[3-chloro-5-(trifluoromethyl)-2-pyridyl]ethyl}-α,α,α-trifluoro-ortho-toluamide or N-[2-[3-chloro-5-(trifluoromethyl)-2-pyridinyl]ethyl]-2-(trifluoromethyl)benzamide. Fluopyram is widely known as a fungicide, belonging to the group of succinate dehydrogenase (SDH) inhibitors. WO 2004/016088 discloses derivatives of the pyridinylethylbenzamide fungicides, for example fluopyram against different phytopathogenic fungi. However, it is not apparent from the teaching of the publication that Fluopyram is highly efficient against the Mosaic scab described above. More particularly, the suitability of fluopyram in combination with Fosetyl-aluminium for treatment of Mosaic scab in apples is not explicitly disclosed.

Phosphonates are salts or esters of phosphorous acid. Salts of phosphorous acid are phosphites. Phosphites may be potassium phosphite, monobasic sodium phosphite, dibasic sodium phosphite, or ammonium phosphite. Phosphites may also be mixtures of different salts, eg as sold in the product Phostrol (Nufarm, USA). In one example Phosphoric acid is mixed with potassium hydroxide providing potassium phosphite. Ester of phosphorous acid are ethyl hydrogen phosphonates, either as an aluminium salt forming aluminium tris (O-ethyl) phosphonate, also called aluminum ethoxyphosphinate or sodium ethoxyphosphinate or calcium ethoxyphosphinate. Phosphonates are known to be fungicidally active in particular against oomycetes like Phytophthora, Plasmopara, Pythium, but also others like Ascomycetes ((Penn State, College of Agricultural Science, Center for Turfgrass Science http://plantscience.psu.edu/research/centers/turf/extension/factsheets/phosphonate-products and Petré, R.et al., 2015, Acta Hort. (ISHS) 1094:431-438))

Fosetyl-aluminium refers to a compound of the formula (II)

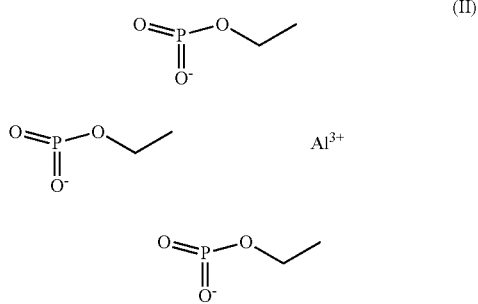

Also known as aluminiumethylhydrogenphosphonate (CAS-No 39148-24-8). Fosetyl-aluminium has been described in DE2456627 as a systemic and curative fungicide with high activity against Oomycetes. Fosetyl-aluminium has also been described as a plant defense inducer in several plants (Petré, R.et al., 2015, Acta Hort. (ISHS) 1094:431-438).

Fungicidal compositions comprising Fluopyram and Fosetyl-aluminium are described in EP-A 1 713 334. However, it is not apparent from the teaching of the publication that fungicidal compositions comprising a fungicide selected from the group of succinate dehydrogenase inhibitors, in particular Fluopyram and a fungicide selected from the group of phosphonates, in particular Fosetyl-aluminium are highly efficient against the Mosaic scab in apples described above.

SUMMARY

It has now been found that compositions comprising a fungicide selected from the group of succinate dehydrogenase inhibitors, in particular Fluopyram and a fungicide selected from the group of phosphonates, in particular Fosetyl-aluminium are outstandingly suitable for control of Mosaic scab in apples.

In one embodiment compositions comprising a fungicide selected from the group of succinate dehydrogenase inhibitors, in particular Fluopyram and a fungicide selected from the group of phosphonates, in particular Fosetyl-aluminium are outstandingly suitable for the reduction of inoculum of Venturia inequalis in senescent leaves at a BBCH stage of 71 and later.

In one embodiment the use of compositions comprising a fungicide selected from the group of succinate dehydrogenase inhibitors, in particular Fluopyram and a fungicide selected from the group of phosphonates, in particular Fosetyl-aluminium for the control of Mosaic scab in apples is described.

In one embodiment a method for treating plants or plant parts for controlling Mosaic scab in apples by treating them with a composition comprising a fungicide selected from the group of succinate dehydrogenase inhibitors, in particular Fluopyram and a fungicide selected from the group of phosphonates, in particular Fosetyl-aluminium.

In one embodiment a method for treating plants or plant parts for reducing of inoculum of Venturia inequalis in senescent leaves at a BBCH stage ranging from BBCH 71 to 97 and later by treating them with a composition comprising a fungicide selected from the group of succinate dehydrogenase inhibitors, in particular Fluopyram and a fungicide selected from the group of phosphonates, in particular Fosetyl-aluminium.

DETAILED DESCRIPTION OF A PREFERRED EMBODIMENT

Mosaic scab (also referred to as sheet scab) refers to a specific form of disease caused by Venturia inaequalis visible in mature leaves of shoots and rosetta leaves of the apple plants or trees at the BBCH stage for pome fruit between 69 and 97, culminating between BBCH 72 to 97, preferably BBCH 91 to 97.

Mosaic scab may be caused by a different developmental stage of Venturia inequalis not known so far in the typical apple scab disease cycle. Classical apple scab occurs in spring at the preflowering stage (BBCH stage 5: Inflorescence emergence) and continues until the harvest and even during storage of the pome fruit. In contrast, Mosaic scab occurs only in leaves in which senescence has started, so typically as of BBCH stage 71. The senescent leaves fall and contain an even higher amount of inoculum both of classical apple scab and Mosaic scab. Mosaic scab may be based on a mutation or specific strains which are still under scientific investigation. Mosaic scab may be characterized by a more superficially development of mycelium and by lower number of conidiophores compared to classical apple scab. Mosaic scab may further be characterized by symptoms like necrotic tissue on the rosette leaves which are the leaves of the flower clusters and the shoot leaves of the brindils and extension shoots. Using certain microscopic techniques it has been shown that the hyphae of Venturia inequalis of Mosaic scab grow more superficial on the cuticula in comparison to classical apple scab which is mainly present under the cuticula.

Venturia inaequalis symptomized as Mosaic scab may also be characterized by its capacity to grow saprophytically than Venturia inaequalis of classical apple scab. One method for testing for capacity to grow more saprophytically is the visual inspection of the fungus growing on detached leaves or growing on artificial substrates. Mosaic scab may also be characterized by microscopic techniques identifying the amount of necrotic cells in infected leaf tissue which will be higher than in classical apple scab.

In the context of the present invention, "control of Mosaic scab in apples" means a significant reduction in infestation by the specific form of Venturia inaequalis present in Mosaic scab symptoms compared with the untreated plant, preferably a significant reduction (by 40-75%), compared with the untreated plant (100%), more preferably an even more significant reduction (by 60-79%), compared with the untreated plant (100%); even more preferably, the infection by Mosaic scab is entirely suppressed (by 70-100%). The control may be curative, i.e. for treatment of already infected plants, or protective, for protection of plants which have not yet been infected.

In the context of the present invention, "reduction of inoculum of Venturia inequalis in senescent leaves starting at a BBCH stage of 71 and later on the fallen leaves on the soil" means a significant amount of inoculum of Venturia inaequalis in senescent leaves at a BBCH stage of 71 and later compared with the untreated plant, preferably a significant reduction (by 40%), compared with the untreated plant (100%), more preferably a significant reduction (by 60%), compared with the untreated plant (100%); even more preferably, the inoculum of Venturia inequalis in senescent leaves at a BBCH stage of 71 and later is entirely suppressed (by 70-100%). Determination of the inoculum may be detected using quantative polymerase chain reaction (qPCR) using primers specific for Mosaic scab. Development of Mosaic scab may occur at an exponential rate between growth stages BBCH 71 and 91. The control may be curative, i.e. for treatment of already infected plants, or protective, for protection of plants which have not yet been infected.

In the context of the present invention, a plant is preferably understood to mean a plant at dormancy stage (BBCH 00 according to the BBCH monograph from the German Federal Biological Research Centre for Agriculture and Forestry, 2nd edition, 2001) or after up to the stage of end of leaf fall (BBCH 97). All BBCH number provided refer to the BBCH definition for pome fruit.

The treatments may be preformed preferably at BBCH stage 69 plus two weeks. This is an alternative way of describing the application timepoint as the time period between 69 (all petal leaves are fallen) and beginning of fruit development is a very long time period. As the timepoint where all petals have fallen can be determined quite easily the expression "BBCH plus two weeks" provides a practical explanation regarding the timing of the application.

All plants and plant parts can be treated in accordance with the invention.

Plants are understood here to mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the transgenic plants and including the plant varieties which are protectable and non-protectable by plant breeders' rights.

The term "apple" is understood to be any plant or plant part of the genus Malus, in particular the cultivated Malus pumila or Malus domesticus. The definition includes any cultivar of Malus, eg cooking apples, cider apples but also those cultivars for direct consumption like Ambrosia, Fuji, Gala, Golden Delicious, Granny Smith, Honeycrisp, Jonagold, McIntosh, Pink Lady, Red Delicious, or wild Malus species like Malus sieversii or Malus sylvestris (crabapple). The term "apple" does not only refer to the fruit, but also to the whole deciduous tree or any part of it, in particular leaves and shoots.

The term "plant parts" are to be understood as meaning all above-ground and below-ground parts and organs of plants, such as shoot, leaf, flower and root, by way of example ears, leaves, needles, stalks, stems, trunks, flowers, fruit bodies, fruits, seed (including seeds of transgenic plants), seedlings, root-stocks, grafts and cuttings, and also roots, and rhizomes. The plant parts also include harvested material and also vegetative and generative propagation material, for example root-stocks, cuttings, grafts, rhizomes, slips and seedlings. Leaves may be rosette leaves, shoot leaves or spur leaves.

Preferred plant parts are leaves, shoots, very preferred are rosette leaves, shoot leaves or spur leaves, particularly preferred shoot leaves.

Succinate dehydrogenase inhibitors (SDHI) are active ingredients which inhibit fungal succinate dehydrogenase, a crucial enzyme of the respiration chain.

In one embodiment the SDHIs are selected from the group comprising of benzovindiflupyr (1072957-71-1), bixafen (581809-46-3), boscalid (188425-85-6), fluindapyr (1383809-87-7), fluopyram (658066-35-4), (2.8) fluxapyroxad (907204-31-3), isofetamid (875915-78-9), isoflucypram (1255734-28-1), isopyrazam (mixture of syn-epimeric racemate 1RS,4SR,9RS and anti-epimeric racemate 1RS, 4SR,9SR) (881685-58-1), isopyrazam (anti-epimeric racemate 1RS,4SR,9SR), isopyrazam (anti-epimeric enantiomer 1R,4S,9S), isopyrazam (anti-epimeric enantiomer 1S,4R, 9R), isopyrazam (syn epimeric racemate 1RS,4SR,9RS), isopyrazam (syn-epimeric enantiomer 1R,4S,9R), isopyrazam (syn-epimeric enantiomer 1S,4R,9S), penthiopyrad (183675-82-3), pydiflumetofen (1228284-64-7).

The Cas-No are provided in brackets.

In one embodiment the SDHIs are selected from the group consisting of benzovindiflupyr (1072957-71-1), bixafen (581809-46-3), boscalid (188425-85-6), fluindapyr (1383809-87-7), fluopyram (658066-35-4), (2.8) fluxapyroxad (907204-31-3), isofetamid (875915-78-9), isoflucypram (1255734-28-1), isopyrazam (mixture of syn-epimeric racemate 1RS,4SR,9RS and anti-epimeric racemate 1RS, 4SR,9SR) (881685-58-1), isopyrazam (anti-epimeric racemate 1RS,4SR,9SR), isopyrazam (anti-epimeric enantiomer 1R,4S,9S), isopyrazam (anti-epimeric enantiomer 1S,4R, 9R), isopyrazam (syn epimeric racemate 1RS,4SR,9RS), isopyrazam (syn-epimeric enantiomer 1R,4S,9R), isopyrazam (syn-epimeric enantiomer 1S,4R,9S), penthiopyrad (183675-82-3), pydiflumetofen (1228284-64-7).

In one embodiment the SDHIs are selected from the group consisting of benzovindiflupyr (1072957-71-1), bixafen (581809-46-3), boscalid (188425-85-6), fluopyram (658066-35-4), (2.8) fluxapyroxad (907204-31-3), isoflucypram (1255734-28-1), isopyrazam (mixture of syn-epimeric racemate 1RS,4SR,9RS and anti-epimeric racemate 1RS, 4SR,9SR) (881685-58-1), isopyrazam (anti-epimeric racemate 1RS,4SR,9SR), isopyrazam (anti-epimeric enantiomer 1R,4S,9S), isopyrazam (anti-epimeric enantiomer 1S,4R, 9R), isopyrazam (syn epimeric racemate 1RS,4SR,9RS), isopyrazam (syn-epimeric enantiomer 1R,4S,9R), isopyrazam (syn-epimeric enantiomer 1S,4R,9S), penthiopyrad (183675-82-3), pydiflumetofen (1228284-64-7).

In one embodiment the SDHIs are selected from the group consisting of benzovindiflupyr (1072957-71-1), bixafen (581809-46-3), boscalid (188425-85-6), fluopyram (658066-35-4), (2.8) fluxapyroxad (907204-31-3), isoflucypram (1255734-28-1), penthiopyrad (183675-82-3), pydiflumetofen (1228284-64-7).

In one embodiment fluopyram is preferred.

Phosphonates are selected from the group comprising of potassium phosphite, monobasic sodium phosphite, dibasic sodium phosphite, ammonium phosphite, aluminium ethyl hydrogen phosphonate, sodium ethyl hydrogen phosphonate, calcium ethyl hydrogen phosphonate.

In one embodiment phosphonates are selected from the group consisting of potassium phosphite, monobasic sodium phosphite, dibasic sodium phosphite, ammonium phosphite, aluminium ethyl hydrogen phosphonates.

In one embodiment phosphonates are selected from the group consisting of potassium phosphite, monobasic sodium phosphite, dibasic sodium phosphite, ammonium phosphite and mixtures thereof.

In one embodiment phosphonates are selected from the group consisting of aluminium ethyl hydrogen phosphonates, also known as Fosetyl-aluminium.

In one embodiment the use of compositions for controlling Mosaic scab comprising a fungicide selected from the group of succinate dehydrogenase inhibitors and a fungicide selected from the group of phosphonates is described on leaves at BBCH stage between 71 and 97.

In one embodiment the use of compositions for controlling Mosaic scab comprising a fungicide selected from the group of succinate dehydrogenase inhibitors and a fungicide selected from the group of phosphonates is described on rosette leaves at BBCH stage between 71 and 97.

In one embodiment the use of compositions for controlling Mosaic scab comprising a fungicide selected from the group of succinate dehydrogenase inhibitors and a fungicide selected from the group of phosphonates is described on shoot leaves at BBCH stage fruit between 71 and 97.

In one embodiment the use of compositions the use of compositions for controlling Mosaic scab comprising a fungicide selected from the group of succinate dehydrogenase inhibitors and a fungicide selected from the group of phosphonates is described on spur leaves at BBCH stage fruit between 71 and 97.

In one embodiment the use of compositions for reducing of inoculum of Venturia inequalis in senescent leaves comprising a fungicide selected from the group of succinate dehydrogenase inhibitors and a fungicide selected from the group of phosphonates is described on leaves at BBCH stage between 71 and 97.

In one embodiment the use of compositions for reducing of inoculum of Venturia inequalis in senescent leaves comprising a fungicide selected from the group of succinate dehydrogenase inhibitors and a fungicide selected from the group of phosphonates is described on rosette leaves at BBCH stage between 71 and 97.

In one embodiment the use of compositions for reducing of inoculum of Venturia inequalis in senescent leaves comprising a fungicide selected from the group of succinate dehydrogenase inhibitors and a fungicide selected from the group of phosphonates is described on shoot leaves at BBCH stage fruit between 71 and 97.

In one embodiment the use of compositions the use of compositions for reducing of inoculum of Venturia inequalis in senescent leaves comprising a fungicide selected from the group of succinate dehydrogenase inhibitors and a fungicide selected from the group of phosphonates is described on spur leaves at BBCH stage fruit between 71 and 97.

In one embodiment the use of compositions for controlling Mosaic scab comprising a fungicide selected from the group of succinate dehydrogenase inhibitors and a fungicide selected from the group of phosphonates is described on leaves at BBCH stage between 69 plus two weeks and 97.

In one embodiment the use of compositions for controlling Mosaic scab comprising a fungicide selected from the group of succinate dehydrogenase inhibitors and a fungicide selected from the group of phosphonates is described on rosette leaves at BBCH stage between 69 plus two weeks and 97.

In one embodiment the use of compositions for controlling Mosaic scab comprising a fungicide selected from the group of succinate dehydrogenase inhibitors and a fungicide selected from the group of phosphonates is described on shoot leaves at BBCH stage fruit between 69 plus two weeks and 97.

In one embodiment the use of compositions the use of compositions for controlling Mosaic scab comprising a fungicide selected from the group of succinate dehydrogenase inhibitors and a fungicide selected from the group of phosphonates is described on spur leaves at BBCH stage fruit between 69 plus two weeks and 97.

In one embodiment the use of compositions for reducing of inoculum of Venturia inequalis in senescent leaves comprising a fungicide selected from the group of succinate dehydrogenase inhibitors and a fungicide selected from the group of phosphonates is described on leaves at BBCH stage between 71 and 69 plus two weeks.

In one embodiment the use of compositions for reducing of inoculum of Venturia inequalis in senescent leaves comprising a fungicide selected from the group of succinate dehydrogenase inhibitors and a fungicide selected from the group of phosphonates is described on rosette leaves at BBCH stage between 69 plus two weeks and 97.

In one embodiment the use of compositions for reducing of inoculum of Venturia inequalis in senescent leaves comprising a fungicide selected from the group of succinate dehydrogenase inhibitors and a fungicide selected from the group of phosphonates is described on shoot leaves at BBCH stage fruit between 69 plus two weeks and 97.

In one embodiment the use of compositions the use of compositions for reducing of inoculum of Venturia inequalis in senescent leaves comprising a fungicide selected from the group of succinate dehydrogenase inhibitors and a fungicide selected from the group of phosphonates is described on spur leaves at BBCH stage fruit between 69 plus two weeks and 97.

List 1 describes the two active ingredient combination of compositions for controlling Mosaic scab comprising a fungicide selected from the group of succinate dehydrogenase inhibitors and a fungicide selected from the group of phosphonates:

List 1:

benzovindiflupyr+sodium phosphite, bixafen+sodium phosphite, boscalid+sodium phosphite, fluindapyr+sodium phosphite, fluopyram+sodium phosphite, fluxapyroxad+sodium phosphite, isofetamid+sodium phosphite, isofetamid+sodium phosphite, isopyrazam (mixture of syn-epimeric racemate 1RS,4SR,9RS and anti-epimeric racemate 1RS,4SR,9SR)+sodium phosphite, isopyrazam (mixture of syn-epimeric racemate 1RS,4SR,9RS and anti-epimeric racemate 1RS,4SR,9SR)+sodium phosphite, isopyrazam (anti-epimeric racemate 1RS,4SR,9SR)+sodium phosphite, isopyrazam (anti-epimeric enantiomer 1R,4S,9S)+sodium phosphite, isopyrazam (syn-epimeric enantiomer 1R,4S,9R),+sodium phosphite, isopyrazam (syn-epimeric enantiomer 1S,4R,9S)+sodium phosphite, penthiopyrad+sodium phosphite, pydiflumetofen+sodium phosphite, benzovindiflupyr+monobasic potassium phosphite, bixafen+monobasic potassium phosphite, boscalid+monobasic potassium phosphite, fluindapyr+monobasic potassium phosphite, fluopyram+monobasic potassium phosphite, fluxapyroxad+monobasic potassium phosphite, isofetamid+monobasic potassium phosphite, isofetamid+monobasic potassium phosphite, isopyrazam (mixture of syn-epimeric racemate 1RS,4SR,9RS and anti-epimeric racemate 1RS,4SR,9SR)+monobasic potassium phosphite, isopyrazam (mixture of syn-epimeric racemate 1RS,4SR,9RS and anti-epimeric racemate 1RS,4SR,9SR)+monobasic potassium phosphite, isopyrazam (anti-epimeric racemate 1RS,4SR,9SR)+ monobasic potassium phosphite, isopyrazam (anti-epimeric enantiomer 1R,4S,9S)+monobasic potassium phosphite, isopyrazam (syn-epimeric enantiomer 1R,4S,9R),+monobasic potassium phosphite, isopyrazam (syn-epimeric enantiomer 1S,4R,9S)+monobasic potassium phosphite, penthiopyrad+monobasic potassium phosphite, pydiflumetofen+monobasic potassium phosphite, benzovindiflupyr+dibasic potassium phosphite, bixafen+dibasic potassium phosphite, boscalid+dibasic potassium phosphite, fluindapyr+dibasic potassium phosphite, fluopyram+dibasic potassium phosphite, fluxapyroxad+dibasic potassium phosphite, isofetamid+dibasic potassium phosphite, isofetamid+dibasic potassium phosphite, isopyrazam (mixture of syn-epimeric racemate 1RS,4SR,9RS and anti-epimeric racemate 1RS,4SR,9SR)+dibasic potassium phosphite, isopyrazam (mixture of syn-epimeric racemate 1RS,4SR,9RS and anti-epimeric racemate 1RS,4SR,9SR)+dibasic potassium phosphite, isopyrazam (anti-epimeric racemate 1RS,4SR,9SR)+dibasic potassium phosphite, isopyrazam (anti-epimeric enantiomer 1R,4S,9S)+dibasic potassium phosphite, isopyrazam (syn-epimeric enantiomer 1R,4S,9R),+dibasic potassium phosphite, isopyrazam (syn-epimeric enantiomer 1S,4R,9S)+dibasic potassium phosphite, penthiopyrad+dibasic potassium phosphite, pydiflumetofen+dibasic potassium phosphite, benzovindiflupyr+ammonium phosphite, bixafen+ammonium phosphite, boscalid+ammonium phosphite, fluindapyr+ammonium phosphite, fluopyram+ammonium phosphite, fluxapyroxad+ammonium phosphite, isofetamid+ammonium phosphite, isofetamid+ammonium phosphite, isopyrazam (mixture of syn-epimeric racemate 1RS,4SR,9RS and anti-epimeric racemate 1RS,4SR,9SR)+ammonium phosphite, isopyrazam (mixture of syn-epimeric racemate 1RS,4SR,9RS and anti-epimeric racemate 1RS,4SR,9SR)+ammonium phosphite, isopyrazam (anti-epimeric racemate 1RS,4SR,9SR)+ammonium phosphite, isopyrazam (anti-epimeric enantiomer 1R,4S,9S)+ammonium phosphite, isopyrazam (syn-epimeric enantiomer 1R,4S,9R),+ammonium phosphite, isopyrazam (syn-epimeric enantiomer 1S,4R,9S)+ammonium phosphite, penthiopyrad+ammonium phosphite, pydiflumetofen+ammonium phosphite, benzovindiflupyr+fosetyl ammonium, bixafen+fosetyl ammonium, boscalid+fosetyl ammonium, fluindapyr+fosetyl ammonium, fluopyram+fosetyl ammonium, fluxapyroxad+fosetyl ammonium, isofetamid+fosetyl ammonium, isofetamid+fosetyl ammonium, isopyrazam (mixture of syn-epimeric racemate 1RS,4SR,9RS and anti-epimeric racemate 1RS,4SR,9SR)+fosetyl ammonium, isopyrazam (mixture of syn-epimeric racemate 1RS,4SR,9RS and anti-epimeric racemate 1RS,4SR,9SR)+fosetyl ammonium, isopyrazam (anti-epimeric racemate 1RS,4SR,9SR)+fosetyl ammonium, isopyrazam (anti-epimeric enantiomer 1R,4S,9S)+fosetyl ammonium, isopyrazam (syn-epimeric enantiomer 1R,4S,9R),+fosetyl ammonium, isopyrazam (syn-epimeric enantiomer 1S,4R,9S)+fosetyl ammonium, penthiopyrad+fosetyl ammonium, pydiflumetofen+fosetyl ammonium, benzovindiflupyr+sodium ethyl hydrogen phosphonate, bixafen+sodium ethyl hydrogen phosphonate, boscalid+sodium ethyl hydrogen phosphonate, fluindapyr+sodium ethyl hydrogen phosphonate, fluopyram+sodium ethyl hydrogen phosphonate, fluxapyroxad+sodium ethyl hydrogen phosphonate, isofetamid+sodium ethyl hydrogen phosphonate, isofetamid+sodium ethyl hydrogen phosphonate, isopyrazam (mixture of syn-epimeric racemate 1RS,4SR,9RS and anti-epimeric racemate 1RS,4SR,9SR)+sodium ethyl hydrogen phosphonate, isopyrazam (mixture of syn-epimeric racemate 1RS,4SR,9RS and anti-epimeric racemate 1RS,4SR,9SR)+sodium ethyl hydrogen phosphonate, isopyrazam (anti-epimeric racemate 1RS,4SR,9SR)+sodium ethyl hydrogen phosphonate, isopyrazam (anti-epimeric enantiomer 1R,4S,9S)+sodium ethyl hydrogen phosphonate, isopyrazam (syn-epimeric enantiomer 1R,4S,9R),+sodium ethyl hydrogen phosphonate, isopyrazam (syn-epimeric enantiomer 1S,4R,9S)+sodium ethyl hydrogen phosphonate, penthiopyrad+sodium ethyl hydrogen phosphonate, pydiflumetofen+sodium ethyl hydrogen phosphonate, benzovindiflupyr+calcium ethyl hydrogen phosphonate, bixafen+calcium ethyl hydrogen phosphonate, boscalid+calcium ethyl hydrogen phosphonate, fluindapyr+calcium ethyl hydrogen phosphonate, fluopyram+calcium ethyl hydrogen phosphonate, fluxapyroxad+calcium ethyl hydrogen phosphonate, isofetamid+calcium ethyl hydrogen phosphonate, isofetamid+calcium ethyl hydrogen phosphonate, isopyrazam (mixture of syn-epimeric racemate 1RS,4SR,9RS and anti-epimeric racemate 1RS,4SR,9SR)+calcium ethyl hydrogen phosphonate, isopyrazam (mixture of syn-epimeric racemate 1RS,4SR,9RS and anti-epimeric racemate 1RS,4SR,9SR)+calcium ethyl hydrogen phosphonate, isopyrazam (anti-epimeric racemate 1RS,4SR,9SR)+calcium ethyl hydrogen phosphonate, isopyrazam (anti-epimeric enantiomer 1R,4S,9S)+calcium ethyl hydrogen phosphonate, isopyrazam (syn-epimeric enantiomer 1R,4S,9R),+calcium ethyl hydrogen phosphonate, isopyrazam (syn-epimeric enantiomer 1S,4R,9S)+calcium ethyl hydrogen phosphonate, penthiopyrad+calcium ethyl hydrogen phosphonate, pydiflumetofen+calcium ethyl hydrogen phosphonate.

In one embodiment the use of compositions for controlling Mosaic scab comprising any of combinations as disclosed in List 1 is described on leaves at BBCH stage between 71 and 97.

In one embodiment the use of compositions for controlling Mosaic scab comprising any of combinations as disclosed in List 1 is described on rosette leaves at BBCH stage between 71 and 97.

In one embodiment the use of compositions for controlling Mosaic scab comprising any of combinations as disclosed in List 1 is described on shoot leaves at BBCH stage fruit between 71 and 97.

In one embodiment the use of compositions for controlling Mosaic scab comprising any of combinations as disclosed in List 1 is described on spur leaves at BBCH stage fruit between 71 and 97.

In one embodiment the use of compositions for controlling Mosaic scab comprising Fluopyram and Fosetyl-aluminium is described on leaves at BBCH stage between 71 and 97.

In one embodiment the use of compositions for controlling Mosaic scab comprising Fluopyram and Fosetyl-aluminium is described on rosette leaves at BBCH stage between 71 and 97.

In one embodiment the use of compositions for controlling Mosaic scab comprising Fluopyram and
Fosetyl-aluminium is described on shoot leaves at BBCH stage fruit between 71 and 97.

In one embodiment the use of compositions for controlling Mosaic scab comprising Fluopyram and Fosetyl-aluminium is described on spur leaves at BBCH stage fruit between 71 and 97.

In one embodiment the use of compositions for reducing the inoculum for Venturia inequalis comprising any of combinations as disclosed in List 1 is described on leaves at BBCH stage between 71 and 97.

In one embodiment the use of compositions for reducing the inoculum for Venturia inequalis comprising any of combinations as disclosed in List 1 is described on rosette leaves at BBCH stage between 71 and 97.

In one embodiment the use of compositions for reducing the inoculum for Venturia inequalis comprising any of combinations as disclosed in List 1 is described on shoot leaves at BBCH stage fruit between 71 and 97.

In one embodiment the use of compositions for reducing the inoculum for Venturia inequalis comprising any of combinations as disclosed in List 1 is described on spur leaves at BBCH stage fruit between 71 and 97.

In one embodiment the use of compositions for reducing the inoculum for Venturia inequalis comprising Fluopyram and Fosetyl-aluminium is described on leaves at BBCH stage between 71 and 97.

In one embodiment the use of compositions for reducing the inoculum for Venturia inequalis comprising Fluopyram and Fosetyl-aluminium is described on rosette leaves at BBCH stage between 71 and 97.

In one embodiment the use of compositions for reducing the inoculum for Venturia inequalis comprising Fluopyram and Fosetyl-aluminium is described on shoot leaves at BBCH stage fruit between 71 and 97.

In one embodiment the use of compositions for reducing the inoculum for Venturia inequalis comprising Fluopyram and Fosetyl-aluminium is described on spur leaves at BBCH stage fruit between 71 and 97.

Compositions comprising a fungicide selected from the group of succinate dehydrogenase inhibitors, in particular Fluopyram and a fungicide selected from the group of phosphonates, in particular Fosetyl-aluminium may be present in their commercially available formulations and in the use forms, prepared from these formulations, as a mixture with other active ingredients, such as insecticides, attractants, sterilants, bactericides, acaricides, nematicides, fungicides, growth regulators, herbicides, safeners, fertilizers, biological control agents, resistance enhacers or semiochemicals.

Compositions comprising Fluopyram and Fosetyl-aluminium may be present in their commercially available formulations and in the use forms, prepared from these formulations, as a mixture with other active ingredients, such as insecticides, attractants, sterilants, bactericides, acaricides, nematicides, fungicides, growth regulators, herbicides, safeners, fertilizers, biological control agents, resistance enhacers or semiochemicals.

In addition, the described positive effect of compositions comprising Fluopyram and Fosetyl-aluminium on the control of Mosaic scab in apples can be promoted by an additional treatment with insecticidal, fungicidal or bactericidal active ingredients, resistance enhancers and biological control agents.

Combinations of compositions comprising Fluopyram and Fosetyl-aluminium with substances including insecticides, fungicides, resistance enhancers and bactericides, fertilizers, growth regulators and biological control agents, can likewise find use in the control of Mosaic scab in apples.

Furthermore compositions comprising Fluopyram and Fosetyl-aluminium may comprise one or more additional fungicides which may be selected from the group consisting of:

(1) Inhibitors of the ergosterol biosynthesis, for example (1.1) aldimorph (1704-28-5), (1.2) azaconazole (60207-31-0), (1.3) bitertanol (55179-31-2), (1.4) bromuconazole (116255-48-2), (1.5) cyproconazole (113096-99-4), (1.6) diclobutrazole (75736-33-3), (1.7) difenoconazole (119446-68-3), (1.8) diniconazole (83657-24-3), (1.9) diniconazole-M (83657-18-5), (1.10) dodemorph (1593-77-7), (1.11) dodemorph acetate (31717-87-0), (1.12) epoxiconazole (106325-08-0), (1.13) etaconazole (60207-93-4), (1.14) fenarimol (60168-88-9), (1.15) fenbuconazole (114369-43-6), (1.16) fenhexamid (126833-17-8), (1.17) fenpropidin (67306-00-7), (1.18) fenpropimorph (67306-03-0), (1.19) fluquinconazole (136426-54-5), (1.20) flurprimidol (56425-91-3), (1.21) flusilazole (85509-19-9), (1.22) flutriafol (76674-21-0), (1.23) furconazole (112839-33-5), (1.24) furconazole-cis (112839-32-4), (1.25) hexaconazole (79983-71-4), (1.26) imazalil (60534-80-7), (1.27) imazalil sulfate (58594-72-2), (1.28) imibenconazole (86598-92-7), (1.29) ipconazole (125225-28-7), (1.30) metconazole (125116-23-6), (1.31) myclobutanil (88671-89-0), (1.32) naftifine (65472-88-0), (1.33) nuarimol (63284-71-9), (1.34) oxpoconazole (174212-12-5), (1.35) paclobutrazol (76738-62-0), (1.36) pefurazoate (101903-30-4), (1.37) penconazole (66246-88-6), (1.38) piperalin (3478-94-2), (1.39) prochloraz (67747-09-5), (1.40) propiconazole (60207-90-1), (1.41) prothioconazole (178928-70-6), (1.42) pyributicarb (88678-67-5), (1.43) pyrifenox (88283-41-4), (1.44) quinconazole (103970-75-8), (1.45) simeconazole (149508-90-7), (1.46) spiroxamine (118134-30-8), (1.47) tebuconazole (107534-96-3), (1.48) terbinafine (91161-71-6), (1.49) tetraconazole (112281-77-3), (1.50) triadimefon (43121-43-3), (1.51) triadimenol (89482-17-7), (1.52) tridemorph (81412-43-3), (1.53) triflumizole (68694-11-1), (1.54) triforine (26644-46-2), (1.55) triticonazole (131983-72-7), (1.56) uniconazole (83657-22-1), (1.57) uniconazole-p (83657-17-4), (1.58) viniconazole (77174-66-4), (1.59) voriconazole (137234-62-9), (1.60) 1-(4-chlorophenyl)-2-(1H-1,2,4-triazol-1-yl)cycloheptanol (129586-32-9), (1.61) methyl 1-(2,2-dimethyl-2,3-dihydro-1H-inden-1-yl)-1H-imidazole-5-carboxylate (110323-95-0), (1.62) N'-{5-(difluoromethyl)-2-methyl-4-[3-(trimethylsilyl)propoxy]phenyl}-N-ethyl-N-methylimidoformamide, (1.63) N-ethyl-N-methyl-N'-{2-methyl-5-(trifluoromethyl)-4-[3-(trimethylsilyl)propoxy]phenyl}imidoformamide and (1.64) O-[1-(4-methoxyphenoxy)-3,3-dimethylbutan-2-yl]1H-imidazole-1-carbothioate (111226-71-2).

(2) inhibitors of the respiratory chain at complex I or II, for example (2.1) bixafen (581809-46-3), (2.2) boscalid (188425-85-6), (2.3) carboxin (5234-68-4), (2.4) diflumetorim (130339-07-0), (2.5) fenfuram (24691-80-3), (2.6) fluopyram (658066-35-4), (2.7) flutolanil (66332-96-5), (2.8) fluxapyroxad (907204-31-3), (2.9) furametpyr (123572-88-3), (2.10) furmecyclox (60568-05-0), (2.11) isopyrazam (mixture of syn-epimeric racemate 1RS,4SR,9RS and anti-epimeric racemate 1RS,4SR,9SR) (881685-58-1), (2.12) isopyrazam (anti-epimeric racemate 1RS,4SR,9SR), (2.13) isopyrazam (anti-epimeric enantiomer 1R,4S,9S), (2.14) isopyrazam (anti-epimeric enantiomer 1S,4R,9R), (2.15) isopyrazam (syn epimeric racemate 1RS,4SR,9RS), (2.16) isopyrazam (syn-epimeric enantiomer 1R,4S,9R), (2.17) isopyrazam (syn-epimeric enantiomer 1S,4R,9S), (2.18) mepronil (55814-41-0), (2.19) oxycarboxin (5259-88-1), (2.20) penflufen (494793-67-8), (2.21) penthiopyrad (183675-82-3), (2.22) sedaxane (874967-67-6), (2.23) thifluzamide (130000-40-7), (2.24) 1-methyl-N-[2-(1,1,2,2-tetrafluoroethoxy)phenyl]-3-(trifluoromethyl)-1H-pyrazole-4-carboxamide, (2.25) 3-(difluoromethyl)-1-methyl-N-[2-(1,1,2,2-tetrafluoroethoxy)phenyl]-1H-pyrazole-4-carboxamide, (2.26) 3-(difluoromethyl)-N-[4-fluoro-2-(1,1,2,3,3,3-hexafluoropropoxy)phenyl]-1-methyl-1H-pyrazole-4-carboxamide, (2.27) N-[1-(2,4-dichlorophenyl)-1-methoxypropan-2-yl]-3-(difluoromethyl)-1-methyl-1H-pyrazole-4-carboxamide (1092400-95-7) (WO 2008148570), (2.28) 5,8-difluoro-N-[2-(2-fluoro-4-{[4-(trifluoromethyl)pyridin-2-yl]oxy}phenyl) ethyl]quinazolin-4-amine (1210070-84-0) (WO2010025451), (2.29) N-[9-(dichloromethylene)-1,2,3,4-tetrahydro-1,4-methanonaphthalen-5-yl]-3-(difluoromethyl)-1-methyl-1H-pyrazole-4-carboxamide, (2.30) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide and (2.31) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide.

(3) inhibitors of the respiratory chain at complex III, for example (3.1) ametoctradin (865318-97-4), (3.2) amisulbrom (348635-87-0), (3.3) azoxystrobin (131860-33-8), (3.4) cyazofamid (120116-88-3), (3.5) coumethoxystrobin (850881-30-0), (3.6) coumoxystrobin (850881-70-8), (3.7) dimoxystrobin (141600-52-4), (3.8) enestroburin (238410-11-2) (WO 2004/058723), (3.9) famoxadone (131807-57-3) (WO 2004/058723), (3.10) fenamidone (161326-34-7) (WO 2004/058723), (3.11) fenoxystrobin (918162-02-4), (3.12) fluoxastrobin (361377-29-9) (WO 2004/058723), (3.13) kresoxim-methyl (143390-89-0) (WO 2004/058723), (3.14) metominostrobin (133408-50-1) (WO 2004/058723), (3.15) orysastrobin (189892-69-1) (WO 2004/058723), (3.16) picoxystrobin (117428-22-5) (WO 2004/058723), (3.17) pyraclostrobin (175013-18-0) (WO 2004/058723), (3.18) pyrametostrobin (915410-70-7) (WO 2004/058723), (3.19) pyraoxystrobin (862588-11-2) (WO 2004/058723), (3.20) pyribencarb (799247-52-2) (WO 2004/058723), (3.21) triclopyricarb (902760-40-1), (3.22) trifloxystrobin (141517-21-7) (WO 2004/058723), (3.23) (2E)-2-(2-{[6-(3-chloro-2-methylphenoxy)-5-fluoropyrimidin-4-yl]oxy}phenyl)-2-(methoxyimino)-N-methylethanamide (WO 2004/058723), (3.24) (2E)-2-(methoxyimino)-N-methyl-2-(2-{[({(1E)-1-[3-(trifluoromethyl) phenyl]ethylidene}amino)oxy] methyl}phenyl)ethanamide (WO 2004/058723), (3.25) (2E)-2-(methoxyimino)-N-methyl-2-{2-[(E)-({1-[3-(trifluoromethyl)phenyl]ethoxy}imino)methyl]phenyl}ethanamide (158169-73-4), (3.26) (2E)-2-{2-[({[(1E)-1-(3-{[(E)-1-fluoro-2-phenylethenyl]oxy}phenyl)ethylidene]amino}oxy) methyl]phenyl}-2-(methoxyimino)-N-methylethanamide (326896-28-0), (3.27) (2E)-2-{2-[({[(2E,3E)-4-(2,6-dichlorophenyl)but-3-en-2-ylidene]amino}oxy) methyl]phenyl}-2-(methoxyimino)-N-methylethanamide, (3.28) 2-chloro-N-(1,1,3-trimethyl-2,3-dihydro-1H-inden-4-yl)pyridine-3-carboxamide (119899-14-8), (3.29) 5-methoxy-2-methyl-4-(2-{[({(1E)-1-[3-(trifluoromethyl)phenyl] ethylidene}amino) oxy]methyl}phenyl)-2,4-dihydro-3H-1,2,4-triazol-3-one, (3.30) methyl (2E)-2-{2-[({cyclopropyl [(4-methoxyphenyl)imino]methyl}sulfanyl)methyl] phenyl}-3-methoxyprop-2-enoate (149601-03-6), (3.31) N-(3-ethyl-3,5,5-trimethylcyclohexyl)-3-(formylamino)-2-hydroxybenzamide (226551-21-9), (3.32) 2-{2-[(2,5-dimethylphenoxy)methyl]phenyl}-2-methoxy-N-methylacetamide (173662-97-0) and (3.33) (2R)-2-{2-[(2,5-dimethylphenoxy)methyl]phenyl}-2-methoxy-N-methylacetamide (394657-24-0).

(4) Inhibitors of the mitosis and cell division, for example (4.1) benomyl (17804-35-2), (4.2) carbendazim (10605-21-7), (4.3) chlorfenazole (3574-96-7), (4.4) diethofencarb (87130-20-9), (4.5) ethaboxam (162650-77-3), (4.6) fluopicolide (239110-15-7), (4.7) fuberidazole (3878-19-1), (4.8) pencycuron (66063-05-6), (4.9) thiabendazole (148-79-8), (4.10) thiophanate-methyl (23564-05-8), (4.11) thiophanate (23564-06-9), (4.12) zoxamide (156052-68-5), (4.13) 5-chloro-7-(4-methylpiperidin-1-yl)-6-(2,4,6-trifluorophenyl)[1, 2,4]triazolo[1,5-a]pyrimidine (214706-53-3) and (4.14) 3-chloro-5-(6-chloropyridin-3-yl)-6-methyl-4-(2,4,6-trifluorophenyl)pyridazine (1002756-87-7).

(5) Compounds capable to have a multisite action, like for example (5.1) bordeaux mixture (8011-63-0), (5.2) captafol (2425-06-1), (5.3) captan (133-06-2) (WO 02/12172), (5.4) chlorothalonil (1897-45-6), (5.5) copper hydroxide (20427-59-2), (5.6) copper naphthenate (1338-02-9), (5.7) copper oxide (1317-39-1), (5.8) copper oxychloride (1332-40-7), (5.9) copper(2+) sulfate (7758-98-7), (5.10) dichlofluanid (1085-98-9), (5.11) dithianon (3347-22-6), (5.12) dodine (2439-10-3), (5.13) dodine free base, (5.14) ferbam (14484-64-1), (5.15) fluorofolpet (719-96-0), (5.16) folpet (133-07-3), (5.17) guazatine (108173-90-6), (5.18) guazatine acetate, (5.19) iminoctadine (13516-27-3), (5.20) iminoctadine albesilate (169202-06-6), (5.21) iminoctadine triacetate (57520-17-9), (5.22) mancopper (53988-93-5), (5.23) mancozeb (8018-01-7), (5.24) maneb (12427-38-2), (5.25) metiram (9006-42-2), (5.26) metiram zinc (9006-42-2), (5.27) oxine-copper (10380-28-6), (5.28) propamidine (104-32-5), (5.29) propineb (12071-83-9), (5.30) sulphur and sulphur preparations including calcium polysulphide (7704-34-9), (5.31) thiram (137-26-8), (5.32) tolylfluanid (731-27-1), (5.33) zineb (12122-67-7) and (5.34) ziram (137-30-4).

(6) Compounds capable to induce a host defence, for example (6.1) acibenzolar-S-methyl (135158-54-2), (6.2) isotianil (224049-04-1), (6.3) probenazole (27605-76-1) and (6.4) tiadinil (223580-51-6).

(7) Inhibitors of the amino acid and/or protein biosynthesis, for example (7.1) andoprim (23951-85-1), (7.2) blasticidin-S (2079-00-7), (7.3) cyprodinil (121552-61-2), (7.4) kasugamycin (6980-18-3), (7.5) kasugamycin hydrochloride hydrate (19408-46-9), (7.6) mepanipyrim (110235-47-7), (7.7) pyrimethanil (53112-28-0) and (7.8) 3-(5-fluoro-3,3,4,4-tetramethyl-3,4-dihydroisoquinolin-l-yl)quinoline (861647-32-7) (WO2005070917).

(8) Inhibitors of the ATP production, for example (8.1) fentin acetate (900-95-8), (8.2) fentin chloride (639-58-7), (8.3) fentin hydroxide (76-87-9) and (8.4) silthiofam (175217-20-6).

(9) Inhibitors of the cell wall synthesis, for example (9.1) benthiavalicarb (177406-68-7), (9.2) dimethomorph (110488-70-5), (9.3) flumorph (211867-47-9), (9.4) iprovalicarb (140923-17-7), (9.5) mandipropamid (374726-62-2), (9.6) polyoxins (11113-80-7), (9.7) polyoxorim (22976-86-9), (9.8) validamycin A (37248-47-8) and (9.9) valifenalate (283159-94-4; 283159-90-0).

(10) Inhibitors of the lipid and membrane synthesis, for example (10.1) biphenyl (92-52-4), (10.2) chloroneb (2675-77-6), (10.3) dicloran (99-30-9), (10.4) edifenphos (17109-49-8), (10.5) etridiazole (2593-15-9), (10.6) iodocarb (55406-53-6), (10.7) iprobenfos (26087-47-8), (10.8) isoprothiolane (50512-35-1), (10.9) propamocarb (25606-41-1), (10.10) propamocarb hydrochloride (25606-41-1), (10.11) prothiocarb (19622-08-3), (10.12) pyrazophos (13457-18-6), (10.13) quintozene (82-68-8), (10.14) tecnazene (117-18-0) and (10.15) tolclofos-methyl (57018-04-9).

(11) Inhibitors of the melanine biosynthesis, for example (11.1) carpropamid (104030-54-8), (11.2) diclocymet (139920-32-4), (11.3) fenoxanil (115852-48-7), (11.4) phthalide (27355-22-2), (11.5) pyroquilon (57369-32-1), (11.6) tricyclazole (41814-78-2) and (11.7) 2,2,2-trifluoroethyl {3-methyl-1-[(4-methylbenzoyl)amino]butan-2-yl}carbamate (851524-22-6) (WO2005042474).

(12) Inhibitors of the nucleic acid synthesis, for example (12.1) benalaxyl (71626-11-4), (12.2) benalaxyl-M (kiralaxyl) (98243-83-5), (12.3) bupirimate (41483-43-6), (12.4) clozylacon (67932-85-8), (12.5) dimethirimol (5221-53-4), (12.6) ethirimol (23947-60-6), (12.7) furalaxyl (57646-30-7), (12.8) hymexazol (10004-44-1), (12.9) metalaxyl (57837-19-1), (12.10) metalaxyl-M (mefenoxam) (70630-17-0), (12.11) ofurace (58810-48-3), (12.12) oxadixyl (77732-09-3) and (12.13) oxolinic acid (14698-29-4).

(13) Inhibitors of the signal transduction, for example (13.1) chlozolinate (84332-86-5), (13.2) fenpiclonil (74738-17-3), (13.3) fludioxonil (131341-86-1), (13.4) iprodione (36734-19-7), (13.5) procymidone (32809-16-8), (13.6) quinoxyfen (124495-18-7) and (13.7) vinclozolin (50471-44-8).

(14) Compounds capable to act as an uncoupler, for example (14.1) binapacryl (485-31-4), (14.2) dinocap (131-72-6), (14.3) ferimzone (89269-64-7), (14.4) fluazinam (79622-59-6) and (14.5) meptyldinocap (131-72-6).

(15) Further compounds, for example (15.1) benthiazole (21564-17-0), (15.2) bethoxazin (163269-30-5), (15.3) capsimycin (70694-08-5), (15.4) carvone (99-49-0), (15.5) chinomethionat (2439-01-2), (15.6) pyriofenone (chlazafenone) (688046-61-9), (15.7) cufraneb (11096-18-7), (15.8) cyflufenamid (180409-60-3), (15.9) cymoxanil (57966-95-7), (15.10) cyprosulfamide (221667-31-8), (15.11) dazomet (533-74-4), (15.12) debacarb (62732-91-6), (15.13) dichlorophen (97-23-4), (15.14) diclomezine (62865-36-5), (15.15) difenzoquat (49866-87-7), (15.16) difenzoquat methylsulphate (43222-48-6), (15.17) diphenylamine (122-39-4), (15.18) ecomate, (15.19) fenpyrazamine (473798-59-3), (15.20) flumetover (154025-04-4), (15.21) fluoroimide (41205-21-4), (15.22) flusulfamide (106917-52-6), (15.23) flutianil (304900-25-2), (15.24) fosetyl-aluminium (39148-24-8), (15.25) fosetyl-calcium, (15.26) fosetyl-sodium (39148-16-8), (15.27) hexachlorobenzene (118-74-1), (15.28) irumamycin (81604-73-1), (15.29) methasulfocarb (66952-49-6), (15.30) methyl isothiocyanate (556-61-6), (15.31) metrafenone (220899-03-6), (15.32) mildiomycin (67527-71-3), (15.33) natamycin (7681-93-8), (15.34) nickel dimethyldithiocarbamate (15521-65-0), (15.35) nitrothal-isopropyl (10552-74-6), (15.36) octhilinone (26530-20-1), (15.37) oxamocarb (917242-12-7), (15.38) oxyfenthiin (34407-87-9), (15.39) pentachlorophenol and salts (87-86-5), (15.40) phenothrin, (15.41) phosphorous acid and its salts (13598-36-2), (15.42) propamocarb-fosetylate, (15.43) propanosine-sodium (88489-02-6), (15.44) proquinazid (189278-12-4), (15.45) pyrimorph (868390-90-3), (15.45e) (2E)-3-(4-tert-butylphenyl)-3-(2-chloropyridin-4-yl)-1-(morpholin-4-yl)prop-2-en-1-one (1231776-28-5), (15.45z) (2Z)-3-(4-tert-butylphenyl)-3-(2-chloropyridin-4-yl)-1-(morpholin-4-yl)prop-2-en-1-one (1231776-29-6), (15.46) pyrrolnitrine (1018-71-9) (EP-A 1 559 320), (15.47) tebufloquin (376645-78-2), (15.48) tecloftalam (76280-91-6), (15.49) tolnifanide (304911-98-6), (15.50) triazoxide (72459-58-6), (15.51) trichlamid (70193-21-4), (15.52) zarilamid (84527-51-5), (15.53) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate (517875-34-2) (WO2003035617), (15.54) 1-(4-{4-[(5R)-5-(2,6-difluorophenyl)-4, 5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003319-79-6) (WO 2008013622), (15.55) 1-(4-{4-[(5S)-5-(2,6-difluorophenyl)-4, 5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003319-80-9) (WO 2008013622), (15.56) 1-(4-{5-[5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone (1003318-67-9) (WO 2008013622), (15.57) 1-(4-methoxyphenoxy)-3,3-dimethylbutan-2-yl 1H-imidazole-1-carboxylate (111227-17-9), (15.58) 2,3,5,6-tetrachloro-4-(methylsulfonyl)pyridine (13108-52-6), (15.59) 2,3-dibutyl-6-chlorothieno[2,3-d]pyrimidin-4(3H)-one (221451-58-7), (15.60) 2, 6-dimethyl-1H,5H-[1,4]dithiino[2,3-c:5,6-c']dipyrrole-1,3,5,7(2H,6H)-tetrone, (15.61) 2-[5-methyl-3-(trifluoromethyl)-1H-pyrazol-1-yl]-1-(4-{4-[(5R)-5-phenyl-4,5-dihydro-1,2-oxazol-3-yl]-1,3-thiazol-2-yl}piperidin-1-yl)ethanone (1003316-53-7) (WO 2008013622), (15.62) 2-[5-methyl-3-(trifluoromethyl)-1H-pyrazol-1-yl]-1-(4-{4-[(5S)-5-phenyl-4,5-dihydro-1,2-oxazol-3-yl]-1,3-thiazol-2-yl}piperidin-1-yl)ethanone (1003316-54-8) (WO 2008013622), (15.63) 2-[5-methyl-3-(trifluoromethyl)-1H-pyrazol-1-yl]-1-{4-[4-(5-phenyl-4,5-dihydro-1,2-oxazol-3-yl)-1,3-thiazol-2-yl]piperidin-1-yl}ethanone (1003316-51-5) (WO 2008013622), (15.64) 2-butoxy-6-iodo-3-propyl-4H-chromen-4-one, (15.65) 2-chloro-5-[2-chloro-1-(2,6-difluoro-4-methoxyphenyl)-4-methyl-1H-imidazol-5-yl]pyridine, (15.66) 2-phenylphenol and salts (90-43-7), (15.67) 3-(4,4,5-trifluoro-3,3-dimethyl-3,4-dihydroisoquinolin-1-yl)quinoline (861647-85-0) (WO2005070917), (15.68) 3,4,5-trichloropyridine-2,6-dicarbonitrile (17824-85-0), (15.69) 3-[5-(4-chlorophenyl)-2,3-dimethyl-1,2-oxazolidin-3-yl]pyridine, (15.70) 3-chloro-5-(4-chlorophenyl)-4-(2,6-difluorophenyl)-6-methylpyridazine, (15.71) 4-(4-chlorophenyl)-5-(2,6-difluorophenyl)-3,6-dimethylpyridazine, (15.72) 5-amino-1,3,4-thiadiazole-2-thiol, (15.73) 5-chloro-N'-phenyl-N'-(prop-2-yn-1-yl)thiophene-2-sulfonohydrazide (134-31-6), (15.74) 5-fluoro-2-[(4-fluorobenzyl)oxy]pyrimidin-4-amine (1174376-11-4) (WO2009094442), (15.75) 5-fluoro-2-[(4-methylbenzyl)oxy]pyrimidin-4-amine (1174376-25-0) (WO2009094442), (15.76) 5-methyl-6-octyl[1,2,4]triazolo[1, 5-a]pyrimidin-7-amine, (15.77) ethyl (2Z)-3-amino-2-cyano-3-phenylprop-2-enoate, (15.78) N'-(4-{[3-(4-chlorobenzyl)-1,2,4-thiadiazol-5-yl]oxy}-2,5-dimethylphenyl)-N-ethyl-N-methylimidoformamide, (15.79) N-(4-chlorobenzyl)-3-[3-methoxy-4-(prop-2-yn-1-yloxy)phenyl]propanamide, (15.80) N-[(4-chlorophenyl)(cyano)methyl]-3-[3-methoxy-4-(prop-2-yn-1-yloxy)phenyl]propanamide, (15.81) N-[(5-bromo-3-chloropyridin-2-yl)methyl]-2,4-dichloropyridine-3-carboxamide, (15.82) N-[1-(5-bromo-3-chloropyridin-2-yl)ethyl]-2,4-dichloropyridine-3-carboxamide, (15.83) N-[1-(5-bromo-3-chloropyridin-2-yl)ethyl]-2-fluoro-4-iodopyridine-3-carboxamide, (15.84) N-{(E)-[(cyclopropylmethoxy)imino][6-(difluoromethoxy)-2,3-difluorophenyl]methyl}-2-phenylacetamide (221201-92-9), (15.85) N-{(Z)-[(cyclopropylmethoxy)imino][6-(difluoromethoxy)-2,3-difluorophenyl]methyl}-2-phenylacetamide (221201-92-9), (15.86) N'-{4-[(3-tert-butyl-4-cyano-1,2-thiazol-5-yl)oxy]-2-chloro-5-methylphenyl}-N-ethyl-N-methylimidoformamide, (15.87) N-methyl-2-(1-{[5-methyl-3-(trifluoromethyl)-1H-pyrazol-1-yl]acetyl}piperidin-4-yl)-N-(1, 2,3,4-tetrahydronaphthalen-1-yl)-1,3-thiazole-4-carboxamide (922514-49-6) (WO 2007014290), (15.88) N-methyl-2-(1-{[5-methyl-3-(trifluoromethyl)-1H-pyrazol-1-yl]acetyl}piperidin-4-yl)-N-[(1R)-1, 2,3,4-tetrahydronaphthalen-1-yl]-1,3-thiazole-4-carboxamide (922514-07-6) (WO 2007014290), (15.89) N-methyl-2-(1-{[5-methyl-3-(trifluoromethyl)-1H-pyrazol-1-yl]acetyl}piperidin-4-yl)-N-[(1S)-1, 2,3,4-tetrahydronaphthalen-1-yl]-1,3-thiazole-4-carboxamide (922514-48-5) (WO 2007014290), (15.90) pentyl {6-[({[(1-methyl-1H-tetrazol-5-yl)(phenyl)methylidene]amino}oxy)methyl]pyridin-2-yl}carbamate, (15.91) phenazine-1-carboxylic acid, (15.92) quinolin-8-ol (134-31-6), (15.93) quinolin-8-ol sulfate (2:1) (134-31-6) and (15.94)

tert-butyl {6-[({[(1-methyl-1H-tetrazol-5-yl)(phenyl)methylene]amino}oxy)methyl]pyridin-2-yl}carbamate.

(16) Further compounds, for example (16.1) 1-methyl-3-(trifluoromethyl)-N-[2'-(trifluoromethyl)biphenyl-2-yl]-1H-pyrazole-4-carboxamide, (16.2) N-(4'-chlorobiphenyl-2-yl)-3-(difluoromethyl)-1-methyl-1H-pyrazole-4-carboxamide, (16.3) N-(2',4'-dichlorobiphenyl-2-yl)-3-(difluoromethyl)-1-methyl-1H-pyrazole-4-carboxamide, (16.4) 3-(difluoromethyl)-1-methyl-N-[4'-(trifluoromethyl)biphenyl-2-yl]-1H-pyrazole-4-carboxamide, (16.5) N-(2',5'-difluorobiphenyl-2-yl)-1-methyl-3-(trifluoromethyl)-1H-pyrazole-4-carboxamide, (16.6) 3-(difluoromethyl)-1-methyl-N-[4'-(prop-1-yn-1-yl)biphenyl-2-yl]-1H-pyrazole-4-carboxamide (known from WO 2004/058723), (16.7) 5-fluoro-1,3-dimethyl-N-[4'-(prop-1-yn-1-yl) biphenyl-2-yl]-1H-pyrazole-4-carboxamide (known from WO 2004/058723), (16.8) 2-chloro-N-[4'-(prop-1-yn-1-yl)biphenyl-2-yl]pyridine-3-carboxamide (known from WO 2004/058723), (16.9) 3-(difluoromethyl)-N-[4'-(3,3-dimethylbut-1-yn-1-yl) biphenyl-2-yl]-1-methyl-1H-pyrazole-4-carboxamide (known from WO 2004/058723), (16.10) N-[4'-(3,3-dimethylbut-1-yn-1-yl)biphenyl-2-yl]-5-fluoro-1, 3-dimethyl-1H-pyrazole-4-carboxamide (known from WO 2004/058723), (16.11) 3-(difluoromethyl)-N-(4'-ethynylbiphenyl-2-yl)-1-methyl-1H-pyrazole-4-carboxamide (known from WO 2004/058723), (16.12) N-(4'-ethynylbiphenyl-2-yl)-5-fluoro-1,3-dimethyl-1H-pyrazole-4-carboxamide (known from WO 2004/058723), (16.13) 2-chloro-N-(4'-ethynylbiphenyl-2-yl)pyridine-3-carboxamide (known from WO 2004/058723), (16.14) 2-chloro-N-[4'-(3, 3-dimethylbut-1-yn-1-yl)biphenyl-2-yl]pyridine-3-carboxamide (known from WO 2004/058723), (16.15) 4-(difluoromethyl)-2-methyl-N-[4'-(trifluoromethyl)biphenyl-2-yl]-1,3-thiazole-5-carboxamide (known from WO 2004/058723), (16.16) 5-fluoro-N-[4'-(3-hydroxy-3-methylbut-1-yn-1-yl)biphenyl-2-yl]-1, 3-dimethyl-1H-pyrazole-4-carboxamide (known from WO 2004/058723), (16.17) 2-chloro-N-[4'-(3-hydroxy-3-methylbut-1-yn-1-yl) biphenyl-2-yl]pyridine-3-carboxamide (known from WO 2004/058723), (16.18) 3-(difluoromethyl)-N-[4'-(3-methoxy-3-methylbut-1-yn-1-yl)biphenyl-2-yl]-1-methyl-1H-pyrazole-4-carboxamide (known from WO 2004/058723), (16.19) 5-fluoro-N-[4'-(3-methoxy-3-methylbut-1-yn-1-yl)biphenyl-2-yl]-1, 3-dimethyl-1H-pyrazole-4-carboxamide (known from WO 2004/058723), (16.20) 2-chloro-N-[4'-(3-methoxy-3-methylbut-1-yn-1-yl)biphenyl-2-yl]pyridine-3-carboxamide (known from WO 2004/058723), (16.21) (5-bromo-2-methoxy-4-methylpyridin-3-yl)(2, 3,4-trimethoxy-6-methylphenyl)methanone (known from EP-A 1 559 320), (16.22) N-[2-(4-{[3-(4-chlorophenyl) prop-2-yn-1-yl]oxy}-3-methoxyphenyl)ethyl]-N2-(methylsulfonyl) valinamide (220706-93-4), (16.23) 4-oxo-4-[(2-phenylethyl)amino]butanoic acid and (16.24) but-3-yn-1-yl {6-[({[(Z)-(1-methyl-1H-tetrazol-5-yl) (phenyl)methylene] amino}oxy)methyl]pyridin-2-yl}carbamate.

All named combination partners of the classes (1) to (16), as well as Fluopyram and Fosetyl-aluminium of the present invention can, if their functional groups enable this, optionally form salts with suitable bases or acids.

In one embodiment a composition comprising Fluopyram and Fosetyl-aluminium may comprise one or more additional fungicides which may be selected from the group consisting of:

(1) Inhibitors of the ergosterol biosynthesis, for example aldimorph, azaconazole, bitertanol, bromuconazole, cyproconazole, diclobutrazole, difenoconazole, diniconazole, diniconazole-M, dodemorph, dodemorph acetate, epoxiconazole, etaconazole, fenarimol, fenbuconazole, fenhexamid, fenpropidin, fenpropimorph, fluquinconazole, flurprimidol, flusilazole, flutriafol, furconazole, furconazole-cis, hexaconazole, imazalil, imazalil sulfate, imibenconazole, ipconazole, metconazole, myclobutanil, naftifine, nuarimol, oxpoconazole, paclobutrazol, pefurazoate, penconazole, piperalin, prochloraz, propiconazole, prothioconazole, pyributicarb, pyrifenox, quinconazole, simeconazole, spiroxamine, tebuconazole, terbinafine, tetraconazole, triadimefon, triadimenol, tridemorph, triflumizole, triforine, triticonazole, uniconazole, uniconazole-p, viniconazole, voriconazole, 1-(4-chlorophenyl)-2-(1H-1, 2,4-triazol-1-yl) cycloheptanol, methyl 1-(2,2-dimethyl-2,3-dihydro-1H-inden-1-yl)-1H-imidazole-5-carboxylate, N'-{5-(difluoromethyl)-2-methyl-4-[3-(trimethylsilyl)propoxy]phenyl}-N-ethyl-N-methylimidoformamide, N-ethyl-N-methyl-N'-{2-methyl-5-(trifluoromethyl)-4-[3-(trimethylsilyl) propoxy] phenyl}imidoformamide and O-[1-(4-methoxyphenoxy)-3,3-dimethylbutan-2-yl]1H-imidazole-1-carbothioate and (2) inhibitors of the respiratory chain at complex I or II, for example (2.1) bixafen (581809-46-3), (2.2) boscalid (188425-85-6), (2.3) carboxin (5234-68-4), (2.4) diflumetorim (130339-07-0), (2.5) fenfuram (24691-80-3), (2.6) fluopyram (658066-35-4), (2.7) flutolanil (66332-96-5), (2.8) fluxapyroxad (907204-31-3), (2.9) furametpyr (123572-88-3), (2.10) furmecyclox (60568-05-0), (2.11) isopyrazam (mixture of syn-epimeric racemate 1RS,4SR,9RS and anti-epimeric racemate 1RS,4SR,9SR) (881685-58-1), (2.12) isopyrazam (anti-epimeric racemate 1RS,4SR,9SR), (2.13) isopyrazam (anti-epimeric enantiomer 1R,4S,9S), (2.14) isopyrazam (anti-epimeric enantiomer 1S,4R,9R), (2.15) isopyrazam (syn epimeric racemate 1RS,4SR,9RS), (2.16) isopyrazam (syn-epimeric enantiomer 1R,4S,9R), (2.17) isopyrazam (syn-epimeric enantiomer 1S,4R,9S), (2.18) mepronil (55814-41-0), (2.19) oxycarboxin (5259-88-1), (2.20) penflufen (494793-67-8), (2.21) penthiopyrad (183675-82-3), (2.22) sedaxane (874967-67-6), (2.23) thifluzamide (130000-40-7), (2.24) 1-methyl-N-[2-(1, 1,2,2-tetrafluoroethoxy)phenyl]-3-(trifluoromethyl)-1H-pyrazole-4-carboxamide, (2.25) 3-(difluoromethyl)-1-methyl-N-[2-(1, 1,2,2-tetrafluoroethoxy)phenyl]-1H-pyrazole-4-carboxamide, (2.26) 3-(difluoromethyl)-N-[4-fluoro-2-(1, 1,2,3,3,3-hexafluoropropoxy)phenyl]-1-methyl-1H-pyrazole-4-carboxamide, (2.27) N-[1-(2, 4-dichlorophenyl)-1-methoxypropan-2-yl]-3-(difluoromethyl)-1-methyl-1H-pyrazole-4-carboxamide (1092400-95-7) (WO 2008148570), (2.28) 5,8-difluoro-N-[2-(2-fluoro-4-{[4-(trifluoromethyl) pyridin-2-yl]oxy}phenyl)ethyl]quinazolin-4-amine (1210070-84-0) (WO2010025451), (2.29) N-[9-(dichloromethylene)-1,2,3,4-tetrahydro-1,4-methanonaphthalen-5-yl]-3-(difluoromethyl)-1-methyl-1H-pyrazole-4-carboxamide, (2.30) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide and (2.31) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide.

(3) inhibitors of the respiratory chain at complex III, for example (3.1) ametoctradin (865318-97-4), (3.2) amisulbrom (348635-87-0), (3.3) azoxystrobin (131860-33-8), (3.4) cyazofamid (120116-88-3), (3.5) coumethoxystrobin (850881-30-0), (3.6) coumoxystrobin (850881-70-8), (3.7) dimoxystrobin (141600-52-4), (3.8) enestroburin (238410-11-2) (WO 2004/058723), (3.9) famoxadone (131807-57-3) (WO 2004/058723), (3.10) fenamidone (161326-34-7) (WO 2004/058723), (3.11) fenoxystrobin (918162-02-4), (3.12)

fluoxastrobin (361377-29-9) (WO 2004/058723), (3.13) kresoxim-methyl (143390-89-0) (WO 2004/058723), (3.14) metominostrobin (133408-50-1) (WO 2004/058723), (3.15) orysastrobin (189892-69-1) (WO 2004/058723), (3.16) picoxystrobin (117428-22-5) (WO 2004/058723), (3.17) pyraclostrobin (175013-18-0) (WO 2004/058723), (3.18) pyrametostrobin (915410-70-7) (WO 2004/058723), (3.19) pyraoxystrobin (862588-11-2) (WO 2004/058723), (3.20) pyribencarb (799247-52-2) (WO 2004/058723), (3.21) triclopyricarb (902760-40-1), (3.22) trifloxystrobin (141517-21-7) (WO 2004/058723), (3.23) (2E)-2-(2-{[6-(3-chloro-2-methylphenoxy)-5-fluoropyrimidin-4-yl]oxy}phenyl)-2-(methoxyimino)-N-methylethanamide (WO 2004/058723), (3.24) (2E)-2-(methoxyimino)-N-methyl-2-(2-{[({(1E)-1-[3-(trifluoromethyl)phenyl]ethylidene}amino)oxy]methyl}phenyl)ethanamide (WO 2004/058723), (3.25) (2E)-2-(methoxyimino)-N-methyl-2-{2-[(E)-({1-[3-(trifluoromethyl)phenyl]ethoxy}imino)methyl]phenyl}ethanamide (158169-73-4), (3.26) (2E)-2-[({[(1E)-1-(3-{[(E)-1-fluoro-2-phenylethenyl]oxy}phenyl)ethylidene]amino}oxy)methyl]phenyl}-2-(methoxyimino)-N-methylethanamide (326896-28-0), (3.27) (2E)-2-{2-[({[(2E,3E)-4-(2, 6-dichlorophenyl)but-3-en-2-ylidene]amino}oxy)methyl]phenyl}-2-(methoxyimino)-N-methylethanamide, (3.28) 2-chloro-N-(1,1,3-trimethyl-2,3-dihydro-1H-inden-4-yl)pyridine-3-carboxamide (119899-14-8), (3.29) 5-methoxy-2-methyl-4-(2-{[({(1E)-1-[3-(trifluoromethyl)phenyl]ethylidene}amino)oxy]methyl}phenyl)-2,4-dihydro-3H-1, 2,4-triazol-3-one, (3.30) methyl (2E)-2-{2-[({cyclopropyl[(4-methoxyphenyl)imino]methyl}sulfanyl)methyl]phenyl}-3-methoxyprop-2-enoate (149601-03-6), (3.31) N-(3-ethyl-3,5,5-trimethylcyclohexyl)-3-(formylamino)-2-hydroxybenzamide (226551-21-9), (3.32) 2-{2-[(2,5-dimethylphenoxy)methyl]phenyl}-2-methoxy-N-methylacetamide (173662-97-0) and (3.33) (2R)-2-{2-[(2,5-dimethylphenoxy)methyl]phenyl}-2-methoxy-N-methylacetamide (394657-24-0) and

(15) Further compounds, for example benthiazole, bethoxazin, capsimycin, carvone, chinomethionat, pyriofenone (chlazafenone), cufraneb, cyflufenamid, cymoxanil, cyprosulfamide, dazomet, debacarb, dichlorophen, diclomezine, difenzoquat, difenzoquat methylsulphate, diphenylamine, ecomate, fenpyrazamine, flumetover, fluoroimide, flusulfamide, flutianil, fosetyl-aluminium, fosetyl-calcium, fosetyl-sodium, hexachlorobenzene, irumamycin, methasulfocarb, methyl isothiocyanate, metrafenone, mildiomycin, natamycin, nickel dimethyldithiocarbamate, nitrothalisopropyl, octhilinone, oxamocarb, oxyfenthiin, pentachlorophenol and salts, phenothrin, phosphorous acid and its salts, propamocarb-fosetylate, propanosine-sodium, proquinazid, pyrimorph, (2E)-3-(4-tert-butylphenyl)-3-(2-chloropyridin-4-yl)-1-(morpholin-4-yl)prop-2-en-1-one, (2Z)-3-(4-tert-butylphenyl)-3-(2-chloropyridin-4-yl)-1-(morpholin-4-yl)prop-2-en-1-one, pyrrolnitrine, tebufloquin, tecloftalam, tolnifanide, triazoxide, trichlamide, zarilamid, (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, 1-(4-{4-[(5R)-5-(2,6-difluorophenyl)-4, 5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-{4-[(5S)-5-(2,6-difluorophenyl)-4,5-dihydro-1, 2-oxazol-3-yl]-1,3-thiazol-2-yl}piperidin-1-yl)-2-[5-methyl-3-(trifluoromethyl)-1H-pyrazol-1-yl]ethanone, 1-(4-{4-[5-(2, 6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-methoxyphenoxy)-3,3-dimethylbutan-2-yl 1H-imidazole-1-carboxylate, 2,3,5,6-tetrachloro-4-(methylsulfonyl)pyridine, 2,3-dibutyl-6-chlorothieno [2, 3-d]pyrimidin-4(3H)-one, 2,6-dimethyl-1H,5H-[1,4]dithiino[2,3-c:5,6-c']dipyrrole-1, 3,5,7(2H,6H)-tetrone, 2-[5-methyl-3-(trifluoromethyl)-1H-pyrazol-1-yl]-1-(4-{4-[(5R)-5-phenyl-4, 5-dihydro-1,2-oxazol-3-yl]-1,3-thiazol-2-yl}piperidin-1-yl)ethanone, 2-[5-methyl-3-(trifluoromethyl)-1H-pyrazol-1-yl]-1-(4-{4-[(5S)-5-phenyl-4,5-dihydro-1,2-oxazol-3-yl]-1,3-thiazol-2-yl}piperidin-1-yl) ethanone, 2-[5-methyl-3-(trifluoromethyl)-1H-pyrazol-1-yl]-1-{4-[4-(5-phenyl-4,5-dihydro-1,2-oxazol-3-yl)-1, 3-thiazol-2-yl]piperidin-1-yl}ethanone, 2-butoxy-6-iodo-3-propyl-4H-chromen-4-one, 2-chloro-5-[2-chloro-1-(2,6-difluoro-4-methoxyphenyl)-4-methyl-1H-imidazol-5-yl]pyridine, 2-phenylphenol and salts, 3-(4,4,5-trifluoro-3,3-dimethyl-3,4-dihydroisoquinolin-1-yl)quinoline, 3,4,5-trichloropyridine-2,6-dicarbonitrile, 3-[5-(4-chlorophenyl)-2,3-dimethyl-1,2-oxazolidin-3-yl]pyridine, 3-chloro-5-(4-chlorophenyl)-4-(2,6-difluorophenyl)-6-methylpyridazine, 4-(4-chlorophenyl)-5-(2, 6-difluorophenyl)-3,6-dimethylpyridazine, 5-amino-1,3,4-thiadiazole-2-thiol, 5-chloro-N'-phenyl-N'-(prop-2-yn-1-yl)thiophene-2-sulfonohydrazide, 5-fluoro-2-[(4-fluorobenzyl)oxy]pyrimidin-4-amine, 5-fluoro-2-[(4-methylbenzyl)oxy]pyrimidin-4-amine, 5-methyl-6-octyl[1,2,4]triazolo[1,5-a]pyrimidin-7-amine, ethyl (2Z)-3-amino-2-cyano-3-phenylprop-2-enoate, N'-(4-{[3-(4-chlorobenzyl)-1,2,4-thiadiazol-5-yl]oxy}-2, 5-dimethylphenyl)-N-ethyl-N-methylimidoformamide, N-(4-chlorobenzyl)-3-[3-methoxy-4-(prop-2-yn-1-yloxy)phenyl] propanamide, N-[(4-chlorophenyl)(cyano)methyl]-3-[3-methoxy-4-(prop-2-yn-1-yloxy)phenyl]propanamide, N-[(5-bromo-3-chloropyridin-2-yl)methyl]-2,4-dichloropyridine-3-carboxamide, N-[1-(5-bromo-3-chloropyridin-2-yl)ethyl]-2,4-dichloropyridine-3-carboxamide, N-[1-(5-bromo-3-chloropyridin-2-yl)ethyl]-2-fluoro-4-iodopyridine-3-carboxamide, N-{(E)-[(cyclopropy-1methoxy)imino][6-(difluoromethoxy)-2,3-difluorophenyl] methyl}-2-phenylacetamide, N-{(Z)-[(cyclopropylmethoxy)imino][6-(difluoromethoxy)-2,3-difluorophenyl]methyl}-2-phenylacetamide, N'-{4-[(3-tert-butyl-4-cyano-1,2-thiazol-5-yl)oxy]-2-chloro-5-methylphenyl}-N-ethyl-N-methylimidoformamide, N-methyl-2-(1-{[5-methyl-3-(trifluoromethyl)-1H-pyrazol-1-yl]acetyl}piperidin-4-yl)-N-(1, 2,3,4-tetrahydronaphthalen-1-yl)-1,3-thiazole-4-carboxamide, N-methyl-2-(1-{[5-methyl-3-(trifluoromethyl)-1H-pyrazol-1-yl]acetyl}piperidin-4-yl)-N-[(1R)-1,2,3,4-tetrahydronaphthalen-1-yl]-1,3-thiazole-4-carboxamide, N-methyl-2-(1-{[5-methyl-3-(trifluoromethyl)-1H-pyrazol-1-yl]acetyl}piperidin-4-yl)-N-[(1S)-1, 2,3,4-tetrahydronaphthalen-1-yl]-1,3-thiazole-4-carboxamide, pentyl {6-[({[(1-methyl-1H-tetrazol-5-yl) (phenyl)methylidene]amino}oxy)methyl]pyridin-2-yl}carbamate, phenazine-1-carboxylic acid, quinolin-8-ol, quinolin-8-ol sulfate (2:1) and tert-butyl {6-[({[(1-methyl-1H-tetrazol-5-yl) (phenyl)methylene]amino}oxy)methyl]pyridin-2-yl}carbamate.

In one embodiment a composition comprising Fluopyram and Fosetyl-alumium may comprise one or more additional fungicides which may be selected from the group consisting of benzovindiflupyr, bixafen, fluxapyroxad, dithianon, fludioxonil, tebuconazole, prothioconazole, difenconazole, epoxiconazole, ipconazole, propamocarb-fosetylate, trifloxystrobin, myclobutanil, captan, mancozeb, propineb, boscalid, penthiopyrad, cyprodinil, kresoxim-methyl, mefentrifluconazole, ipfentrifluconazole, inpyrfluxam, isoflucypram, fluindapyr, quinofumelin, trifloxystrobin, fosetyl-aluminium, pyrimethanil, Bacillus subtilis strain QST713 (marketed under Serenade, Bayer CropScience).

Compositions

The compositions comprising a fungicide selected from the group of succinate dehydrogenase inhibitors, in particular Fluopyram and a fungicide selected from the group of phosphonates, in particular Fosetyl-aluminium may further comprise at least one other additional component such as auxiliaries, solvents, carriers or supports, filler, surfactants or extenders, all being agriculturally acceptable.

According to the invention the term "support" or "carrier" is to be understood as meaning a natural or synthetic, organic or inorganic substance which is mixed or combined with the active compounds for better applicability, in particular for application to plants or plant parts or seeds. The support or carrier, which may be solid or liquid, is generally inert and should be suitable for use in agriculture. Suitable solid or liquid carriers/supports include for example ammonium salts and natural ground minerals, such as kaolins, clays, talc, chalk, quartz, attapulgite, montmorillonite or diatomaceous earth, and ground synthetic minerals, such as finely divided silica, alumina and natural or synthetic silicates, resins, waxes, solid fertilizers, water, alcohols, especially butanol, organic solvents, mineral oils and vegetable oils, and also derivatives thereof. It is also possible to use mixtures of such supports or carriers. Solid supports/carriers suitable for granules are: for example crushed and fractionated natural minerals, such as calcite, marble, pumice, sepiolite, dolomite, and also synthetic granules of inorganic and organic meals and also granules of organic material, such as sawdust, coconut shells, maize cobs and tobacco stalks. Suitable liquefied gaseous extenders or carriers are liquids which are gaseous at ambient temperature and under atmospheric pressure, for example aerosol propellants, such as butane, propane, nitrogen and carbon dioxide. Tackifiers, such as carboxymethylcellulose and natural and synthetic polymers in the form of powders, granules and latices, such as gum arabic, polyvinyl alcohol, polyvinyl acetate, or else natural phospholipids, such as cephalins and lecithins and synthetic phospholipids can be used in the formulations. Other possible additives are mineral and vegetable oils and waxes, optionally modified. If the extender used is water, it is also possible for example, to use organic solvents as auxiliary solvents. Suitable liquid solvents are essentially: aromatic compounds, such as xylene, toluene or alkylnaphthalenes, chlorinated aromatic compounds or chlorinated aliphatic hydrocarbons, such as chlorobenzenes, chloroethylenes or methylene chloride, aliphatic hydrocarbons, such as cyclohexane or paraffins, for example mineral oil fractions, mineral and vegetable oils, alcohols, such as butanol or glycol, and also ethers and esters thereof, ketones, such as acetone, methyl ethyl ketone, methyl isobutyl ketone or cyclohexanone, strongly polar solvents, such as dimethylformamide and dimethyl sulphoxide, and also water.

In the present specification, the term "surfactant" comprises an emulsifier, a dispersing agent or a wetting agent of ionic or non-ionic type or a mixture of such surfactants. Mention may be made, for example, of polyacrylic acid salts, lignosulphonic acid salts, phenolsulphonic or naphthalenesulphonic acid salts, polycondensates of ethylene oxide with fatty alcohols or with fatty acids or with fatty amines, substituted phenols (in particular alkylphenols or arylphenols), salts of sulphosuccinic acid esters, taurine derivatives (in particular alkyl taurates), phosphoric esters of polyoxyethylated alcohols or phenols, fatty acid esters of polyols, and derivatives of the above compounds containing sulphate, sulphonate and phosphate functions. The presence of at least one surfactant is generally essential when the active material and/or the inert support are water-insoluble and when the vector agent for the application is water. Preferably, surfactant content may be comprised between 5% and 40% by weight of the composition.

Additional components may also be included, e.g. protective colloids, adhesives, thickeners, thixotropic agents, penetration agents, stabilisers, sequestering agents. More generally, the active materials can be combined with any solid or liquid additive, which complies with the usual formulation techniques.

It is further possible to use colourants such as inorganic pigments, for example iron oxide, titanium oxide, Prussian blue, and organic dyes, such as alizarin dyes, azo dyes and metal phthalocyanine dyes, and trace nutrients, such as salts of iron, manganese, boron, copper, cobalt, molybdenum and zinc.

In general, the compositions according to the invention may contain from 0.05 to 99% (by weight) of active material, preferably 0.1 to 95% by weight, more preferably 1 to 90% by weight, most preferably 10 to 70% by weight.

Compositions comprising a fungicide selected from the group of succinate dehydrogenase inhibitors, in particular Fluopyram and a fungicide selected from the group of phosphonates, in particular Fosetyl-aluminium can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

These compositions include not only compositions which are ready to be applied to the plant or seed to be treated by means of a suitable device, such as a spraying or dusting device, but also concentrated commercial compositions which must be diluted before they are applied to the crop.

In one embodiment, the compositions comprising a fungicide selected from the group of succinate dehydrogenase inhibitors, in particular Fluopyram and a fungicide selected from the group of phosphonates, in particular Fosetyl-aluminium, are applied by spraying the tree canopy. In one embodiment, the compositions comprising a fungicide selected from the group of succinate dehydrogenase inhibitors, in particular Fluopyram and a fungicide selected from the group of phosphonates, in particular Fosetyl-aluminium, are applied by, spraying, shoots, trunks, and leaves to be treated.

The use of the compositions comprising a fungicide selected from the group of succinate dehydrogenase inhibitors, in particular Fluopyram and a fungicide selected from the group of phosphonates, in particular Fosetyl-aluminium, envisaged are effected with an application rate between 0.1 and 1.5 kg/ha/mCH of total active ingredient, preferably between 0.25 and 1 kg/ha/mCH. mCH stands for metre of canopy height. In one embodiment the application rate is 1 kg/ha/mCH of total active ingredient, in another embodiment the application rate is 0.666 kg/ha/mCH of total active ingredient.

In one embodiment the application rate for the succinate dehydrogenase inhibitor is 0.01 to 0.5 0.05 to 0.8 kg/ha/mCH, and the application rate for the phosphonate is 0.05 to 0.8 kg/ha/mCH. Preferably, the application rate for the succinate dehydrogenase inhibitor is 0.03 to 0.4 kg/ha/mCH, and the application rate for the phosphonate is 0.2 to 0.7 kg/ha/mCH.

In another embodiment the application rate for Fluopyram is 0.01 to 0.5 kg/ha/mCH, and the application rate for Fosetyl-aluminium is 0.05 to 0.8 kg/ha/mCH. Preferably, the application rate Fluopyram is 0.03 to 0.4 kg/ha/mCH, and the application rate for Fosetyl-aluminium is 0.2 to 0.7 kg/ha/mCH.

In another embodiment the application rate for Fluopyram is 0.01 to 0.5 kg/ha/mCH, preferably, the application rate Fluopyram is 0.03 to 0.4 kg/ha/mCH, and the application rate for Fosetyl-aluminium is 0.05 to 0.8 kg/ha/mCH, preferably the application rate for Fosetyl-aluminium is 0.2 to 0.7 kg/ha/mCH.

In another embodiment the application rate for Fosetyl-aluminium is 0.666 kg/ha/mCH, and the application rate for Fluopyram is 0.05 kg/ha/mCH. In another embodiment the application rate Fosetyl-aluminium is 0.444 kg/ha/mCH, and the application rate for Fluopyram is 0.033 kg/ha/mCH.

In general, the weight ratio of the succinate dehydrogenase inhibitor to the phosphonate is from 2000:1 to 1:1000.

The weight ratio of the succinate dehydrogenase inhibitor to the phosphonate is preferably from 100:1 to 1:100; more preferably from 20:1 to 1:50. The active ingredient mixture of the succinate dehydrogenase inhibitor to the phosphonate comprises the succinate dehydrogenase inhibitor and the phosphonate as described above preferably in a mixing ratio of from 1000:1 to 1:1000, very preferably from 50:1 to 1:50, more preferably in a ratio of from 20:1 to 1:20, even more preferably from 10:1 to 1:10, very preferably from 5:1 and 1:5, special preference being giv-en to a ratio of from 2:1 to 1:2, and a ratio of from 4:1 25 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are understood to include, on the one hand, ratios by weight and also, on other hand, molar ratios.

In one embodiment, the compositions comprising a fungicide selected from the group of succinate dehydrogenase inhibitors, in particular Fluopyram and a fungicide selected from the group of phosphonates, in particular Fosetyl-aluminium, are applied by, spraying of the tree canopy, In one embodiment, the compositions comprising Fluopyram and Fosetyl-aluminium, are applied by dipping, spraying, atomizing, irrigating, evaporating, painting, spreading-on, watering (drenching), drip irrigating, chemigating or injecting seedlings, root-stocks, grafts and cuttings, stems, shoots, trunks, and leaves to be treated.

The use of the compositions comprising Fluopyram and Fosetyl-aluminium envisaged are effected preferably with an application rate between 0.15 and 2 kg/ha of active ingredient.

In order to convert kg product per hectare application to kg product per ha and metre of canopy height (m CH) the following conversion may be applied: 3 kg product per ha orchard soil corresponds to 1 kg of product per mCH or 2 kg per ha of leafwall area corresponds to 1 kg of product per mCH.

In one embodiment the compositions comprising Fluopyram and Fosetyl-aluminium are applied up to three times per season after BBCH stage 69 (after flowering) in pomefruit.

In one embodiment the compositions comprising Fluopyram and Fosetyl-aluminium are applied up to three times per season after BBCH stage 69 (after flowering) in apples.

In one embodiment the compositions comprising Fluopyram and Fosetyl-aluminium are applied up to three times per season after BBCH stage 69 (after flowering) in pears.

Formulations

Depending on their particular physical and/or chemical properties, a fungicide selected from the group of succinate dehydrogenase inhibitors, in particular Fluopyram and a fungicide selected from the group of phosphonates, in particular Fosetyl-aluminiumcan be converted in accordance with the invention to the customary formulations, such as solutions, emulsions, suspensions, powders, foams, pastes, granules, aerosols and microencapsulations in polymeric substances and in coating materials for seed, and also ULV cool and warm fogging formulations.

Depending on their particular physical and/or chemical properties, Fluopyram and Fosetyl-aluminiumcan be converted in accordance with the invention to the customary formulations, such as solutions, emulsions, suspensions, powders, foams, pastes, granules, aerosols and microencapsulations in polymeric substances and in coating materials for seed, and also ULV cool and warm fogging formulations.

The formulations contain generally between 0.01 and 95 percent by weight of active ingredient, preferably between 0.05 and 90%, more preferably between 0.1 and 80%.

These formulations are produced in a known manner, for example by mixing the active ingredients with extenders, i.e. liquid solvents, liquefied gases under pressure and/or solid carriers, optionally using surfactants, i.e. emulsifiers and/or dispersants, and/or foam formers. If the extender used is water, it is also possible to use, for example, organic solvents as auxiliary solvents. Useful liquid solvents are essentially: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, or else water. Liquefied gaseous extenders or carriers are understood to mean those liquids which are gaseous at standard temperature and under standard pressure, for example aerosol propellants such as halohydrocarbons, or else butane, propane, nitrogen and carbon dioxide. Useful solid carriers are: for example natural rock flours such as kaolins, clays, talc, chalk, quartz, attapulgite, montmorillonite or diatomaceous earth, and synthetic rock flours such as finely divided silica, alumina and silicates. Useful solid carriers for granules are: for example crushed and fractionated natural rocks such as calcite, pumice, marble, sepiolite, dolomite, and synthetic granules of inorganic and organic flours, and also granules of organic material such as sawdust, coconut shells, maize cobs and tobacco stalks. Useful emulsifiers and/or foam generators are: for example nonionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates, or else protein hydrolysates. Useful dispersants include: for example lignosulphite waste liquors and methylcellulose.

In the formulations it is possible to use tackifiers such as carboxymethylcellulose, natural and synthetic polymers in the form of powders, granules or latices, such as gum arabic, polyvinyl alcohol and polyvinyl acetate, or else natural phospholipids such as cephalins and lecithins and synthetic phospholipids. Further additives may be mineral and vegetable oils.

It is possible to use colorants such as inorganic pigments, for example iron oxide, titanium oxide and Prussian Blue, and organic dyes such as alizarin dyes, azo dyes and metal phthalocyanine dyes, and trace nutrients such as salts of iron, manganese, boron, copper, cobalt, molybdenum and zinc.

One of the advantages of the present invention is that, owing to the particular systemic properties of Fluopyram and Fosetyl-aluminium, the treatment of the plants, plant parts as for example leaves, stems, trunks and shoots, and plants grown from seedlings, root stocks, grafts and cuttings with Fluopyram and Fosetyl-aluminium not only the control of Mosaic scab on the plant itself, but also on the plant parts which originate therefrom after plant growth. In this way, the immediate treatment of the crop before or at the time of transplanting, or after can be dispensed.

The example which follows serves to illustrate the invention, but without restricting it.

EXAMPLES

Example 1 Mosaic Scab in Apples

Apple plants of the variety Jonagold in apple orchards in Belgium were treated in different schemes with a variety of commercial standards like captan or dithianon in comparison to compositions comprising Fluopyram and Fosetyl-aluminium in 2016 according to application scheme as outlined in table 1.

The application volume was 300 litres/ha and Fluopyram was used at a rate of 50 g/ha/mCH, Fosetyl-aluminium was used at a rate of 666 g/ha/mCH. This corresponded for the product Luna Care comprising Fluoyram and Fosetyl-aluminium to the dose rate of 1000 g/ha/mCH.

Delan comprises the active ingredient dithianon. Scala comprises the active ingredient pyrimethanil. Geyser or Score comprises the active ingredient difenoconazole. Flint plus comprises the active ingredients trifloxystrobine and captan. Merpan comprises the active ingredient captan. UTC corresponds to untreated control. Luna Privilege comprises the active ingredient Fluopyram. Untreated control is abbreviated as UTC.

TABLE 1

| | | 9DAB | 7DAB | 11DAC | 8DAD | 8DAF | | 7DAG | 7DAH | 7DAI | 7DAJ |
|---|---|---|---|---|---|---|---|---|---|---|---|
| Date | 12 Apr. 2016 | 21 Apr. 2016 | 28 Apr. 2016 | 9 May 2016 | 17 May 2016 | 2 Jun. 2016 | | 9 Jun. 2016 | 16 Jun. 2016 | 23 Jun. 2016 | 30 Jun. 2016 |
| BBCH | 55 | 56 | 60 | 65 | 69 | | 69 plus two weeks | 72 | 73 | 75 | 77 |
| Treatment 1 | UTC | UTC | | | | | | | | | |
| Treatment 2 | Delan | Merpan + Scala | Merpan | Merpan + Geyser | Merpan | Flint Plus | Merpan | Merpan | Merpan | Merpan | Merpan |
| Treatment 3 | LUNA CARE | Merpan + Scala | LUNA CARE | Merpan + Geyser | LUNA CARE | Flint Plus | Merpan | Merpan | Merpan | Merpan | Merpan |
| Treatment 4 | Delan | Merpan + Scala | c Merpan | Merpan + Geyser | Merpan | Flint Plus | LUNA CARE | Merpan | LUNA CARE | Merpan | LUNA CARE |

In Table 2 the disease incidence of mosaic scab was determined evaluating 100 leaves. The standard schedule based on captan-dithianon is shown as treatment 2, in treatment 3 LUNA CARE is included in the primary classical scab period when the ascospores are released (as early as BBCH 55) and in treatment 4 the late schedule applying LUNA CARE starting at BBCH 69 plus 2 weeks and continuing up to BBCH 75 is disclosed, which covers the period when mosaic scab initially occurs. The statistical analysis is based on a 2 way Anova analysis and multiple comparisons are based on Newman-Keuls test. The Student-Newman-Keuls ($P=0.05$) test was used for the multiple comparisons of means and expressed by letters; treatment lines which significantly differ are expressed by different letters.

TABLE 2

Table 2. *Venturia inequalis* incidence (%) of specifically mosaic symptoms on leaves of Jonagold apples at 4 timepoints over the summer period

| Trt | Entry Description | AI-Total | FL-Type | Dosage Form. | Appl. Codes | Assessment Date 29 Jun. 2016 Mean(Val) | 8 Jul. 2016 Mean(Val) | 18 Jul. 2016 Mean(Val) | 16 Aug. 2016 Mean(Val) |
|---|---|---|---|---|---|---|---|---|---|
| 1 | UNTREATED | | | | | 35.3 a | 40 a | 50.5 a | 83 a |
| 2 | DELAN | 75 | WP | 250 G/HA/M CH | A | 4.3 b | 16 b | 31 b | 52.8 bc |
|   | MERPAN | 80 | WG | 600 G/HA/M CH | B | | | | |
|   | SCALA | 400 | SC | 250 ML/HA/M CH | B | | | | |
|   | MERPAN | 80 | WG | 600 G/HA/M CH | CEGHIJK | | | | |
|   | MERPAN | 80 | WG | 600 G/HA/M CH | D | | | | |
|   | SCORE | 250 | EC | 50 ML/HA/M CH | D | | | | |
|   | FLINT PLUS | 64 | WG | 625 G/HA/M CH | F | | | | |
| 3 | LUNA CARE | 71.6 | WG | 1000 G/HA/M CH | ACE | 2.5 b | 9.5 b | 19.8 c | 40.3 bc |
|   | MERPAN | 80 | WG | 600 G/HA/M CH | B | | | | |
|   | SCALA | 400 | SC | 250 ML/HA/M CH | B | | | | |
|   | MERPAN | 80 | WG | 600 G/HA/M CH | D | | | | |
|   | SCORE | 250 | EC | 50 ML/HA/M CH | D | | | | |
|   | FLINT PLUS | 64 | WG | 625 G/HA/M CH | F | | | | |
|   | MERPAN | 80 | WG | 600 G/HA/M CH | GHIJK | | | | |
| 4 | DELAN | 75 | WP | 250 G/HA/M CH | A | 3.3 b | 6 b | 15.8 c | 30.8 c |
|   | MERPAN | 80 | WG | 600 G/HA/M CH | B | | | | |
|   | SCALA | 400 | SC | 250 ML/HA/M CH | B | | | | |
|   | MERPAN | 80 | WG | 600 G/HA/M CH | CEHJ | | | | |
|   | MERPAN | 80 | WG | 600 G/HA/M CH | D | | | | |
|   | SCORE | 250 | EC | 50 ML/HA/M CH | D | | | | |
|   | FLINT PLUS | 64 | WG | 625 G/HA/M CH | F | | | | |
|   | LUNA CARE | 71.6 | WG | 1000 G/HA/M CH | GIK | | | | |

Example 2 Mosaic Scab in Apples

Apple plants of the variety Jonagold in apple orchards in Belgium were treated in different schemes with a variety of commercial standards like captan or dithianon in comparison to compositions comprising Fluopyram and Fosetyl-aluminium in 2017 according to application scheme as outlined in table 3.

The application volume was 300 litres/ha and Fluopyram was used at a rate of 50 g/ha/mCH, Fosetyl-aluminium was used at a rate of 666 g/ha/mCH. This corresponded for the product Luna Care comprising Fluoyram and Fosetyl-aluminium to the dose rate of 1000 g/ha/mCH.

Delan comprises the active ingredient dithianon. Scala comprises the active ingredient pyrimethanil. Geyser comprises the active ingredient difenoconazole. Flint plus comprises the active ingredients trifloxystrobine and captan. Merpan comprises the active ingredient captan. UTC corresponds to untreated control. Luna Privilege comprises the active ingredient Fluopyram. Untreated control is abbreviated as UTC.

TABLE 3

| Date | 5 Apr. 2017 | 7DAA 12 Apr. 2017 | 7DAB 19 Apr. 2017 | 7DAC 26 Apr. 2017 | 8DAD 3 May 2017 | 8DAE 12 May 2017 | 10DAF 22 May 2017 | 8DAF 30 May 2017 | 9DAG 8 Jun. 2017 | 11DAH 19 Jun. 2017 | 9DAI 28 Jun. 2017 | 12DAJ 10 Jul. 2017 |
|---|---|---|---|---|---|---|---|---|---|---|---|---|
| BBCH | 57 | 61-65 | 65 | 69 | 69 | 69 | 71 | 71 | 72 | 73 | 75 | 77 |
| Treatment 1 | UTC | | | | | | | | | | | |
| Treatment 2 | Delan | Merpan + Scala | Merpan | Merpan + Geyser | Merpan | Flint Plus | Flint Plus | Merpan | Merpan | Merpan | Merpan | Merpan |

TABLE 3-continued

| Date | 5 Apr. 2017 | 7DAA 12 Apr. 2017 | 7DAB 19 Apr. 2017 | 7DAC 26 Apr. 2017 | 8DAD 3 May 2017 | 8DAE 12 May 2017 | 10DAF 22 May 2017 | 8DAF 30 May 2017 | 9DAG 8 Jun. 2017 | 11DAH 19 Jun. 2017 | 9DAI 28 Jun. 2017 | 12DAJ 10 Jul. 2017 |
|---|---|---|---|---|---|---|---|---|---|---|---|---|
| Treatment 3 | Delan | Merpan + Scala | Merpan | Merpan + Geyser | Merpan | Flint Plus | Flint Plus | LUNA CARE | Merpan | LUNA CARE | Merpan | LUNA CARE |
| Treatment 4 | LUNA CARE | Merpan + Scala | LUNA CARE | Merpan + Geyser | LUNA CARE | Flint Plus | Flint Plus | Merpan | Merpan | Merpan | Merpan | Merpan |

Application volume is 300 L/ha and Fluopyram is used at a rate of 50 g/ha/mCH, Fosetyl-aluminium is used at a rate of 666 g/ha/mCH. This corresponds for the formulated product Luna Care with the dose rate of 1000 g/ha/mCH.

The statistical analysis is based on a two way Anova analysis and multiple comparisons are based on Newman-Keuls test. The Student-Newman-Keuls (P=0.05) test was used for the multiple comparisons of means and expressed by letters; treatment lines which significantly differ are expressed by different letters.

Table 4 Disease incidence (%) of specifically mosaic scab symptoms on leaves of Jonagold apples at 4 September at BBCH 83.

TABLE 4

| Treatment | Entry Description | Dosage Form. | Appl. Codes | Assessment Date Apr. 9, 2017 Mean(M) | |
|---|---|---|---|---|---|
| Treatment 1 | UNTREATED | | | 99 | a |
| Treatment 2 | DELAN WG | 0.05 KG/100 L | A | 57.4 | b |
| | MERPAN | 1.9 KG/HA | BCDEGHIJK | | |
| | SCALA | 0.75 L/HA | B | | |
| | Flint Plus | 1.875 KG/HA | F | | |
| Treatment 3 | DELAN WG | 0.05 KG/100 L | A | 26.9 | c |
| | LUNA CARE | 1 KG/HA/M CH | GIK | | |
| | MERPAN | 1.9 KG/HA | BCDEHJ | | |
| | SCALA | 0.75 L/HA | B | | |
| | Flint Plus | 1.875 KG/HA | F | | |
| Treatment 4 | LUNA CARE | 1 KG/HA/M CH | ACE | 36.5 | c |
| | MERPAN | 1.9 KG/HA | BDGHIJK | | |
| | SCALA | 0.75 L/HA | B | | |
| | Flint Plus | 1.875 KG/HA | F | | |

Example 3

Reduction of Inoculum of Venturia Inequalis

Apple plants of the apple variety Jonagold (mutation Novajo) in Belgium were treated in different schemes during the 2017 season with a schedule based on a variety of commercial standards like captan or dithianon, pyrimethanil, difenconazole (in comparison to schedule including the composition comprising fluopyram and fosetyl-aluminium in an early (BBCH 55-BBCH 69) and late positioning in 2016 (BBCH 71-BBCH 77) according to application scheme as outlined in table 5. From the treated plots and from the four replicates separately all leaves dropped on the soil were collected at 50 and 100% leaf drop respectively and kept together in plastic nets to avoid lateral interference from adjacent plots. These captured leaves in the nets remained on the ground in the orchard and were exposed to natural climat conditions in the winter and next spring. The ascospores released from the formed pseudothecia in these leaves were captured by rotorods at several timepoints (n=18) over the primary scab season period from 18 April up to 4 Jul. 2017.

TABLE 5

| | Appl. Code | | | | | | | | | | |
|---|---|---|---|---|---|---|---|---|---|---|---|
| Date | A 12 Apr. 2016 | B 9DAB 21 Apr. 2016 | C 7DAB 28 Apr. 2016 | D 11DAC 9 May 2016 | E 8DAD 17 May 2016 | F 8DAF 25 May 2016 | G 8DAG 2 Jun. 2016 | H 7DAH 9 Jun. 2016 | I 7DAI 16 Jun. 2016 | J 7DAJ 23 Jun. 2016 | K |
| | Ascospores | Peak ascospores | Ascospores | Peak ascospores | Ascospores | | Conidia | Conidia | Conidia | Conidia | Conidia |
| BBCH | 55 | 56 | 60 | 65 | 69 | | 71 | 72 | 73 | 75 | 77 |
| Treatment 1 | UTC | UTC | | | | | | | | | |
| Treatment 2 | Delan | Merpan + pyrimethanil | Merpan | Merpan | Merpan | Flint Plus | Merpan | Merpan | Merpan | Merpan | Merpan |
| Treatment 3 | LUNA CARE | Merpan + pyrimethanil | LUNA CARE | Merpan + difenconazole | LUNA CARE | Flint Plus | Merpan | Merpan | Merpan | Merpan | Merpan |
| Treatment 4 | Delan | Merpan + pyrimethanil | Merpan | Merpan + difenconazole | Merpan | Flint Plus | LUNA CARE | Merpan | LUNA CARE | Merpan | LUNA CARE |

On the rotorods strips with the captured ascospores the amount of ascospores was determined using quantative PCR (qPCR) technique determining the VENTURIA INEQUALIS-DNA content within the leaf material within the period of primary scab. Extraction of DNA from apple leaves is done by the fine tuned qPCR technique according to the methods of ILVO, Torfs S. et al. (in preparation for submission for publication). The amount of VENTURIA INEQUALIS DNA is expressed in spore equivalents as indicated in table 6.

TABLE 6

Total number of detected ascospore equivalents detected via qpCR

| | | Average total number of detected ascospore equivalents | significant difference |
|---|---|---|---|
| Treatment 1 | check | 35763.542 | a |
| Treatment 2 | standaard schedule | 22858.292 | |
| Treatment 3 | Luna care earlyapplications | 19408.446 | |
| Treatment 4 | Luna care late applications Registered schedule | 14633.898 | b |
| Treatment 4 | Symptom less leaves | 851.78069 | |
| Treatment 4 | Leaves with only mosaic scab | 21901.88 | |

The DUNCAN pairwise comparisons revealed that Treatment 4 differed significantly from Treatment 1. Mosaic scab is adding to inoculum, of 35000 ascospore equivalents in total about 22000 ascospore equivalents are related to Mosaic scab.

Example 4 Mosaic Scab in Apples

Apple plants of the variety Novajo in apple orchards in Belgium were treated in different schemes with a variety of commercial standards like captan or dithianon in comparison to compositions comprising Fluopyram and Fosetyl-aluminium in 2017 according to application scheme as outlined in table 7.

The application volume was 300 litres/ha and Fluopyram was used at a rate of 50 g/ha/mCH, Fosetyl-aluminium was used at a rate of 666 g/ha/mCH. This corresponded for the product Luna Care comprising Fluoyram and Fosetyl-aluminium to the dose rate of 1000 g/ha/mCH.

Geyser comprises the active ingredient difenoconazole. Flint plus comprises the active ingredients trifloxystrobine and captan. Merpan comprises the active ingredient captan. Scala comprises the active ingredient pyrimethanil. Captan comprises the active ingredient Captan. UTC corresponds to an untreated control. These products were applied in accordance with their respective label instructions.

TABLE 7

| Treatment No | Date | UTC | Standard scheme | Fluopyram/Fosety-aluminium |
|---|---|---|---|---|
| A | 2016 Apr. 12 | NA | Delan | Delan |
| B | 2016 Apr. 21 | NA | Captan + Scala | Captan + Scala |
| C | 2016 Apr. 28 | NA | Captan | Captan |
| D | 2016 May 9 | NA | Captan + Geyser | Captan + Geyser |
| E | 2016 May 17 | NA | Flint Plus | Flint Plus |
| F | 2016 May 25 | NA | Captan | Fluopyram + Fosety-aluminium |
| G | 2016 Jun. 2 | NA | Captan | Captan |
| H | 2016 Jun. 9 | NA | Captan | Fluopyram + Fosety-aluminium |
| I | 2016 Jun. 16 | NA | Captan | Captan |
| J | 2016 Jun. 23 | NA | Captan | Fluopyram + Fosety-aluminium |
| K | 2016 Jun. 30 | NA | Captan | Fluopyram + Fosety-aluminium |

The efficacy on mosaic scab is measured as Abbott Incidence counted on each 20 random rosetta leaves in five occasions. Abbott incidence refers to the % reduction of the fungal population (see Abbott, J. Econ. Entomol. (125) 18:265-267). Consequently the higher the number, the better the control of Mosaic scab.

| Date [days after Treatment No] | UTC | Standard scheme | Fluopyram/Fosety-aluminium |
|---|---|---|---|
| 6 J | 35.3 | 87.3 | 90.8 |
| 8 K | 40.0 | 60.0 | 85.0 |
| 18 K | 50.5 | 38.6 | 68.8 |
| 47 K | 83.0 | 36.4 | 63.0 |

The invention claimed is:

1. A method comprising applying a composition comprising a first fungicide and a second fungicide to an apple plant, leaves, a shoot, leaves of an apple, an apple orchard, or an area, or any combination thereof affected by mosaic scab in an amount sufficient to alleviate symptoms of mosaic scab, or control mosaic scab, or both, wherein the first fungicide comprises a succinate dehydrogenase inhibitor and the second fungicide comprises a phosphonate.

2. The method according to claim 1, wherein the succinate dehydrogenase inhibitor is selected from the group consisting of benzovindiflupyr (1072957-71-1), bixafen (581809-46-3), boscalid (188425-85-6), fluindapyr (1383809-87-7), fluopyram (658066-35-4), (2.8) fluxapyroxad (907204-31-3), isofetamid (875915-78-9), isoflucypram (1255734-28-1), isopyrazam (mixture of syn-epimeric racemate 1RS,4SR,9RS and anti-epimeric racemate 1RS,4SR,9SR) (881685-58-1), isopyrazam (anti-epimeric racemate 1RS,4SR,9SR), isopyrazam (anti-epimeric enantiomer 1R,4S,9S), isopyrazam (anti-epimeric enantiomer 1S,4R,9R), isopyrazam (syn epimeric racemate 1RS,4SR,9RS), isopyrazam (syn-epimeric enantiomer 1R,4S,9R), isopyrazam (syn-epimeric enantiomer 1S,4R,9S), penthiopyrad (183675-82-3), and pydiflumetofen (1228284-64-7), and combination thereof.

3. The method according to claim 1, wherein phosphonate is selected from the group consisting of potassium phosphite, monobasic sodium phosphite, dibasic sodium phosphite, ammonium phosphite, aluminium ethyl hydrogen phosphonate (Fosetyl-aluminium), sodium ethyl hydrogen phosphonate, and calcium ethyl hydrogen phosphonate, and combination thereof.

4. The method according to claim 1, wherein the first fungicide is Fluopyram.

5. The method according to claim 1, wherein the second fungicide is Fosetyl-aluminium.

6. The method according to claim 1, wherein the first fungicide is Fluopyram and the second fungicide is Fosetyl-aluminium.

7. The method according to claim 1, wherein the composition is applied at BBCH stage 71.

8. The method according to claim 1, wherein the composition is applied at BBCH stage 69 plus two weeks.

9. The method according to claim 1, wherein the composition is applied at an application rate between 0.1 and 1.5 kg/ha/mCH of total active ingredient.

10. The method according to claim 1, wherein the composition is capable of reducing an amount of inoculum of Venturia inequalis capable of infecting an apple plant and plant parts in a future season.

11. The method of claim 1, wherein the composition is applied at an application rate between 0.1 and 1.5 kg/ha/mCH of total active ingredient.

12. The method of claim 1, wherein the composition is applied at from about BBCH stage 71 to about BBCH stage 97.

13. The method of claim 1, wherein the composition is applied at from about BBCH stage 69 plus two weeks to about BBCH stage 97.

14. The method of claim 1, wherein the composition is applied up to three times per season after about BBCH stage 69.

15. The method of claim 1, wherein the weight ratio of the first fungicide to the second fungicide is from about 20:1 to about 1:50.

16. The method of claim 1, wherein the weight ratio of the first fungicide to the second fungicide is from about 2:1 to about 1:2.

17. The method of claim 1, wherein the composition comprises a solution, an emulsion, a suspension, a powder, a foam, a paste, granules, an aerosol, a microencapsulation, a coating, or a fogging formulation, or any combination thereof.

18. A method comprising applying a first fungicide and a second fungicide to an apple plant, leaves, a shoot, leaves of an apple, an apple orchard, or an area, or any combination thereof affected by mosaic scab in an amount sufficient to alleviate symptoms of mosaic scab, or control mosaic scab, or both, wherein the first fungicide comprises a succinate dehydrogenase inhibitor and the second fungicide comprises a phosphonate.

19. The method according to claim 18, wherein the first fungicide is Fluopyram and the second fungicide is Fosetyl-aluminium.

20. The method according to claim 18, wherein the first fungicide and the second fungicide are applied at different application rates expressed as kg per hectare per meter of canopy height.

* * * * *